US012561749B2

(12) United States Patent
Mustapha et al.

(10) Patent No.: US 12,561,749 B2
(45) Date of Patent: Feb. 24, 2026

(54) FIELD SURVEY SYSTEM

(71) Applicant: Schlumberger Technology Corporation, Sugar Land, TX (US)

(72) Inventors: Hussein Mustapha, Abu Dhabi (AE); Samat Ramatullayev, Abu Dhabi (AE)

(73) Assignee: SCHLUMBERGER TECHNOLOGY CORPORATION SUGAR, Land, TX (US)

( * ) Notice: Subject to any disclaimer, the term of this patent is extended or adjusted under 35 U.S.C. 154(b) by 41 days.

(21) Appl. No.: 18/693,256

(22) PCT Filed: Oct. 12, 2022

(86) PCT No.: PCT/US2022/046447
§ 371 (c)(1),
(2) Date: Mar. 19, 2024

(87) PCT Pub. No.: WO2023/064391
PCT Pub. Date: Apr. 20, 2023

(65) Prior Publication Data
US 2025/0124525 A1 Apr. 17, 2025

Related U.S. Application Data

(60) Provisional application No. 63/262,410, filed on Oct. 12, 2021.

(51) Int. Cl.
*G06Q 10/06* (2023.01)
*G06Q 10/0631* (2023.01)
*G06Q 50/02* (2012.01)

(52) U.S. Cl.
CPC ....... *G06Q 50/02* (2013.01); *G06Q 10/06315* (2013.01)

(58) Field of Classification Search
CPC ......................... G06Q 50/02; G06Q 10/06315
See application file for complete search history.

(56) References Cited

U.S. PATENT DOCUMENTS

2011/0060572 A1 * 3/2011 Brown .................... E21B 43/00
703/10
2015/0153470 A1 * 6/2015 Stove ........................ G01V 3/18
702/6

(Continued)

FOREIGN PATENT DOCUMENTS

CA 3065684 A1 * 6/2020 ............... G01V 1/30
WO WO-2017188858 A1 * 11/2017 ............. G06F 30/00

(Continued)

OTHER PUBLICATIONS

Figueiredo Barata, José Felipe, et al. "Multi-criteria indicator for sustainability rating in suppliers of the oil and gas industries in Brazil." Sustainability 6.3 (2014): 1107-1128. (Year: 2014).*

(Continued)

*Primary Examiner* — Hamzeh Obaid
(74) *Attorney, Agent, or Firm* — Kyle R. Miiller

(57) ABSTRACT

A method can include receiving scenarios for one or more field sites, where the scenarios account for performance and non-performance of a field survey; generating fluid flow results for each of the scenarios for the one or more field sites; receiving probabilities for at least one technical field survey criterion; and generating values, based on the fluid flow results and the probabilities, that quantify the performance of the field survey at the one or more field sites.

20 Claims, 21 Drawing Sheets

(56)                    References Cited

U.S. PATENT DOCUMENTS

2016/0230513 A1 *   8/2016   Dykstra  .................. E21B 43/26
2020/0102819 A1 *   4/2020   Watanabe  ............. E21B 47/107

FOREIGN PATENT DOCUMENTS

WO       WO-2018208634 A1 *  11/2018   ............. G01V 1/306
WO           2019222129 A1    11/2019
WO           2020150540 A1     7/2020

OTHER PUBLICATIONS

Search Report and Written Opinion of International Patent Application No. PCT/Us2022/046447 dated Jan. 17, 2023, 8 pages.
Grose, T. et al., "Risk-Based Surveillance Planning: a Practical Value-of-Information Approach for Data Acquisition in Producing Fields", SPE-184409-PA, Economics & Management, 2017, 9(01), pp. 1-11.

* cited by examiner

System 100

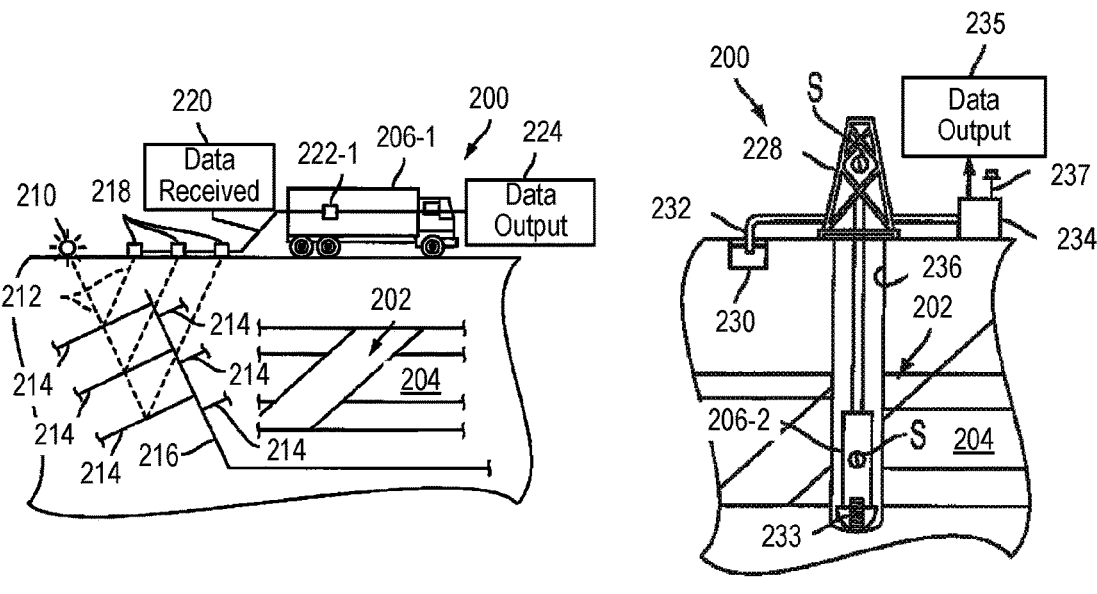
FIG. 2A
FIG. 2B
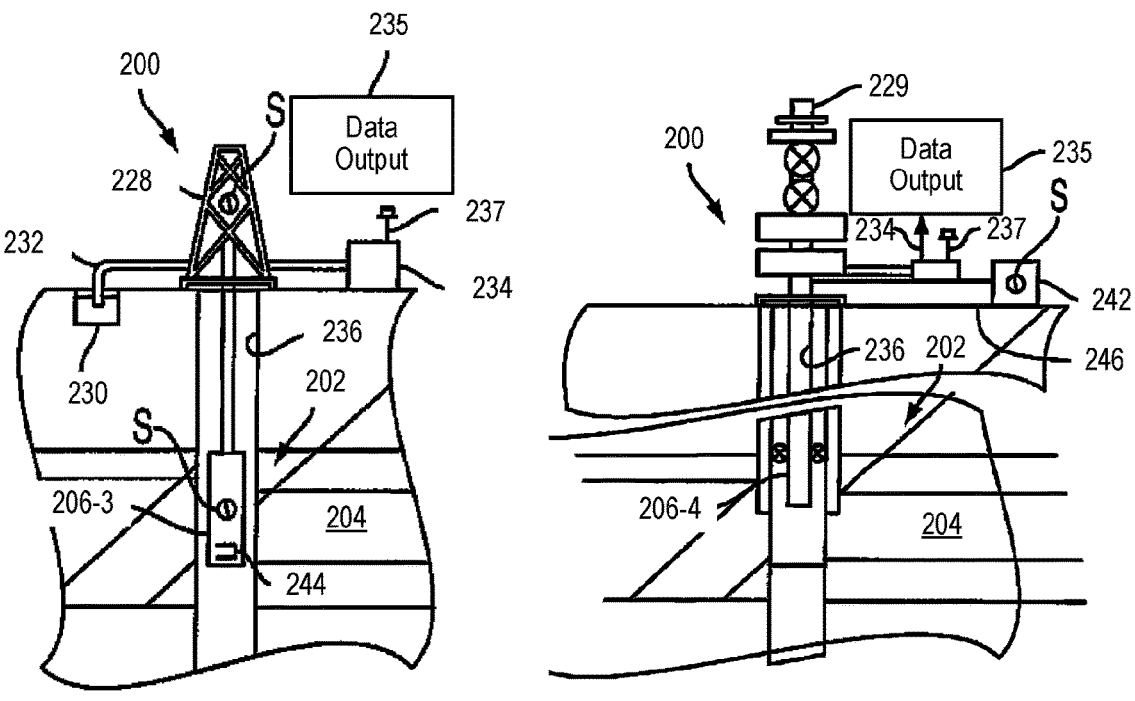
FIG. 2C
FIG. 2D

600

600
(continued)

Proxy Model(s)
(e.g., distinction of interest)
650

Sensitivity Analysis
660

Probability Distribution
(e.g., guided by domain knowledge)
670

Estimate(s)
680

VoI

Value of Information (VoI)
(e.g., expected value with and without)
690

800

| Conveyance | Survey | Vol Solution |
|---|---|---|
| Well Test, Well Logging | BHCIP, BHCIP+GRAD | Pressure data acquisition |
| | BHFP, MRT, PI | |
| | PBU | |
| | PFO | |
| | Interference test | Tracer data acquisition |
| Well Logging | RST | RST |
| | PLT | PLT acquisition for water shut-off (WSO) |
| | Corrosion | Corrosion data acquisition |

| Load Simulation Case | Select Survey: | Define Analysis Period: |
|---|---|---|
| Upload Data: | 1) BHCIP / BHCIP + GRAD<br>2) BHFP / MRT / PI<br>3) PBU<br>4) PFO<br>5) Corrosion<br>6) RST<br>7) PLT<br>8) Other(s) | Start Date:<br><br>End Date:<br><br><br><br>Execute |

Well Map:

Y [ ○ ○ ○ ○ ○ ] X

List of Selected Results:

Well 1
Well 2
Well 3
. . .
Well n

| Select Well(s) |
| --- |

| Create New Well |
| --- |

| Well 1<br>Well 2<br>Well 3<br>. . .<br>Well n |
| --- |

| Res Simulation Well(s) |
| --- |

| Upload Data |
| --- |

| Well 1<br>Well 2<br>Well 3<br>. . .<br>Well n |
| --- |

PoS

| 1. Technically Feasible? | |
| --- | --- |

| Add Criterion / Sub-Criterion |
| --- |

| 1) Expected hole accessibility | |
| --- | --- |
| X > 70% | 100 |
| 40% < X < 70% | 70 |
| 30% < X < 40% | 40 |

| 2) Risk of Well Ceasing to Flow in PLT | |
| --- | --- |
| Low | 100 |
| Medium | 50 |
| High | 10 |

| 3) Well Trajectory | |
| --- | --- |
| Vertical | 100 |
| Highly Deviated | 90 |
| Horizontal | 70 |

PoS

| 2. Conclusive Results? | |
| --- | --- |

| Add Criterion / Sub-Criterion |
| --- |

| 4) Wellbore Accessibility | |
| --- | --- |
| X > 80% | 100 |
| 50% < X < 80% | 80 |
| 20% < X < 50% | 40 |

PoS

| 3. Successful WSO? | |
| --- | --- |

| Add Criterion / Sub-Criterion |
| --- |

| 5) Reservoir Conditions | |
| --- | --- |
| Good | 100 |
| Medium | 70 |
| Bad | 40 |

| 6) Production String / Hole Conditions | |
| --- | --- |
| Good | 100 |
| Medium | 70 |
| Bad | 10 |

| 7) Location of Water Prod. Interval(s) | |
| --- | --- |
| Toe of Well | 90 |
| Heel or Middle | 60 |
| Homogeneous Water Prod. Profile | 0 |

| 8) Horizontal Section Length | |
| --- | --- |
| X < 3000 ft | 90 |
| 3000 ft < X < 10000 ft | 70 |
| X > 10000 ft | 40 |

Figure 12:
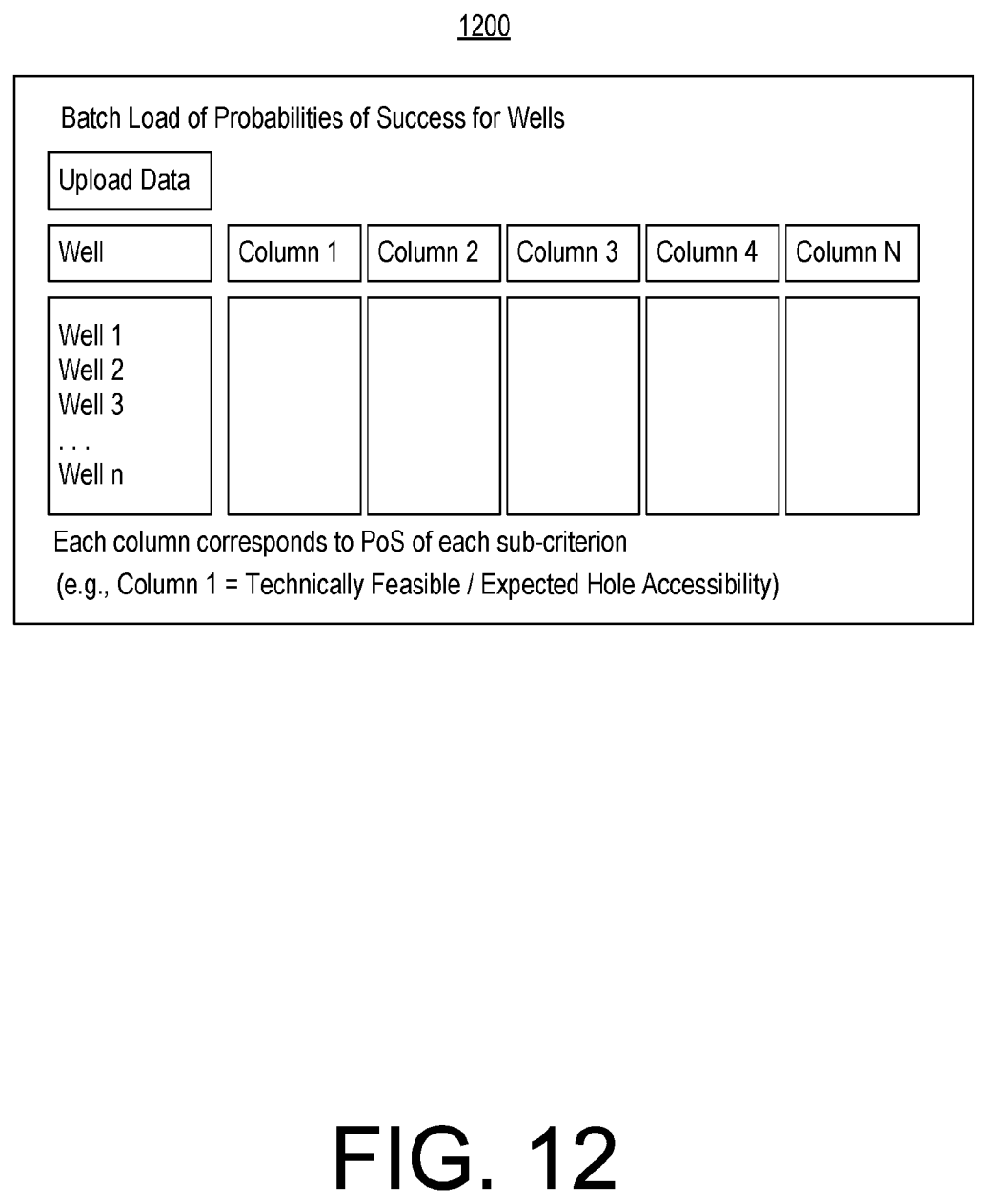

Batch Load of Probabilities of Success for Wells

| Upload Data |
|---|

| Well | Column 1 | Column 2 | Column 3 | Column 4 | Column N |
|---|---|---|---|---|---|
| Well 1<br>Well 2<br>Well 3<br>. . .<br>Well n | | | | | |

Each column corresponds to PoS of each sub-criterion (e.g., Column 1 = Technically Feasible / Expected Hole Accessibility)

| 1. Define Production Profile Scenarios |
| --- |

| Add New Scenario |
| --- |

| a) Well ceases to flow | b) Well flows naturally |
| --- | --- |

| Select Well(s) |
| --- |

| Well 1<br>Well 2<br>Well 3<br>. . .<br>Well n |
| --- |

| 2. Select Method to Estimate Production |
| --- |

| Analytical Method | Reservoir Simulation |
| --- | --- |

| Simulation: |
| --- |

| Start: |
| --- |

| End: |
| --- |

| 2.1 Analytical |
| --- | a) Well ceases to flow
Current oil prod. rates
Current water prod. rates
Oil prod. decline rate (%)
Water prod. increase rate (%)

b) Well flows naturally
Current oil prod. rates
Current water prod. rates
Oil prod. decline rate (%)
Water prod. increase rate (%)

Constraints
Min oil production rate
Max water cut

| 2.2 Reservoir Simulation |
| --- | a) Well ceases to flow
NFA Case b) Well flows naturally
NFA with WSO Case
Completion WC Shut-off Limit

| 3. Input NPV Parameters |
| --- |

NPV Initial Costs:
1. Cost of PLT operation, millions USD
2. Cost of WSO operations, millions USD

NPV Estimation Using Production Data
Discount rate, %
Oil price, USD/stb
Operating cost, USD/stb
Number of years, years

FIG. 13

Batch Load NPV Calculation Parameters for Well(s)     1400

Analytical Method

| Parameters | | | a) Well ceases to flow | | | b) Well flows naturally | |
|---|---|---|---|---|---|---|---|
| Well | Curr. Oil Prod. Rate | Curr. Water Prod. Rate | Min. Oil Prod. Rate | Min. Water Prod. Rate | Oil Prod. Decline Rate | Water Prod. Increase | Oil Prod. Decline | Water Prod. Increase |
| Well 1 Well 2 Well 3 ... Well n | | | | | | | | |

Reservoir Simulation

| Parameters | | | b) Well flows naturally | |
|---|---|---|---|---|
| Well | Oil Prod. Rate Limit to Shut Well | Well BHP Limit | Max. Water Cut Limited to Shut Well | Max. Water Cut Limit to Shut Completion |
| Well 1 Well 2 Well 3 ... Well n | | | | | a) Well ceases to flow

Upload Data b) Well flows naturally

Upload Data

Method <u>2000</u>

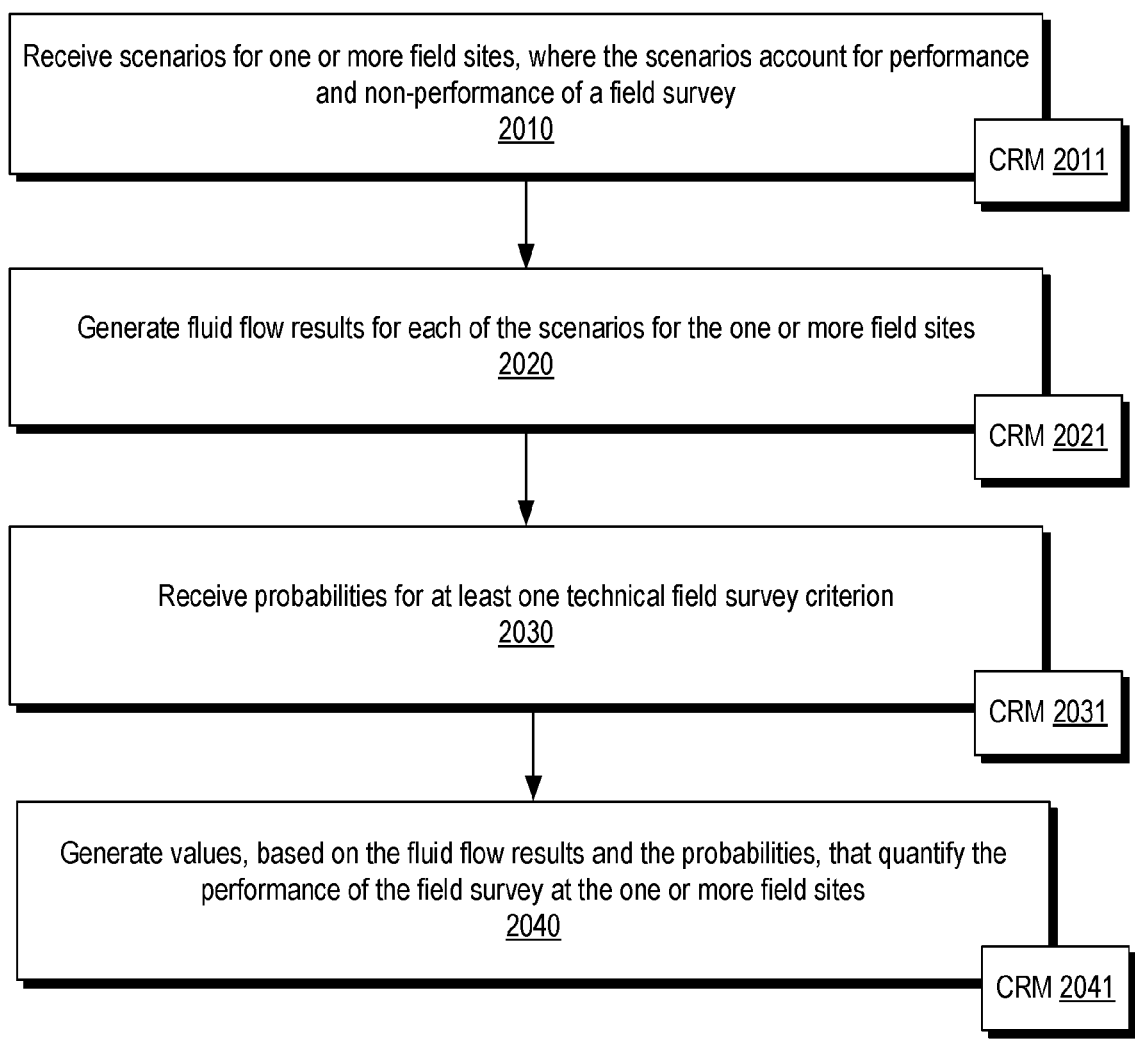

Receive scenarios for one or more field sites, where the scenarios account for performance and non-performance of a field survey
<u>2010</u>

CRM <u>2011</u>

Generate fluid flow results for each of the scenarios for the one or more field sites
<u>2020</u>

CRM <u>2021</u>

Receive probabilities for at least one technical field survey criterion
<u>2030</u>

CRM <u>2031</u>

Generate values, based on the fluid flow results and the probabilities, that quantify the performance of the field survey at the one or more field sites
<u>2040</u>

CRM <u>2041</u>

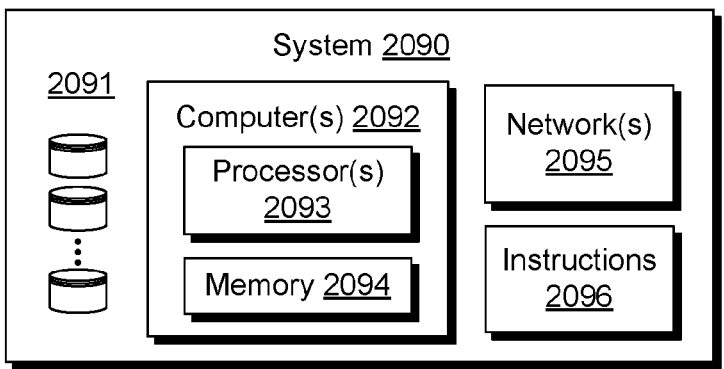

System <u>2090</u>

<u>2091</u>

Computer(s) <u>2092</u>

Processor(s)
<u>2093</u>

Memory <u>2094</u>

Network(s)
<u>2095</u>

Instructions
<u>2096</u>

FIELD SURVEY SYSTEM

RELATED APPLICATION

This application is a National Stage Entry of International Patent Application No. PCT/US2022/046447, filed on Oct. 12, 2022, which claims priority to and the benefit of U.S. Provisional Application No. 63/262,410, filed on Oct. 12, 2021, each of which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations. In such an example, control may be based at least in part on characteristics of rock where drilling into such rock forms a borehole that can be completed to form a well to produce from a reservoir and/or to inject fluid into a reservoir.

Various services pertain to well and/or reservoir surveillance, which can help to ensure robust well and/or reservoir management. However, data acquired as part of routine surveillance operations may or may not add an expected value. Moreover, it may be quite challenging to quantify an expected added value due to absence of methodology or time-consuming nature of screening using ensembles of different geological simulation models as well as associated uncertainties. Without an ability to assess value of information (VoI) of one or more services at one or more field sites, uninformed decisions may be made according to schedules and/or available resources. For example, a schedule may indicate that a certain service is to be performed at a particular well four times a year, one time every three months. In such an example, the usefulness of performing the service according to the schedule may not be known a priori. And, if data acquired by the service merely indicates that there has been no substantial change in production from the well, then the resources expended to perform the service at the well may actually diminish return for the well, particularly where production from the well may have been interrupted (e.g., halted or otherwise diminished) to perform the service. Accordingly, an approach that relies on a schedule alone may waste valuable resources and may diminish production of valuable hydrocarbons. Where value of information (VoI) can be assessed prior to decision making and performance of services at various field sites, resources may be better applied for purposes of achieving production goals.

While hydrocarbon fluid reservoirs are mentioned as an example, a reservoir that includes water and brine may be assessed, for example, for one or more purposes such as, for example, carbon storage (e.g., sequestration), water production or storage, geothermal production or storage, metallic extraction from brine, etc.

SUMMARY

A method can include receiving scenarios for one or more field sites, where the scenarios account for performance and non-performance of a field survey; generating fluid flow results for each of the scenarios for the one or more field sites; receiving probabilities for at least one technical field survey criterion; and generating values, based on the fluid flow results and the probabilities, that quantify the performance of the field survey at the one or more field sites.

A system can include one or more processors; a memory accessible to at least one of the one or more processors; processor-executable instructions stored in the memory and executable to instruct the system to: receive scenarios for one or more field sites, where the scenarios account for performance and non-performance of a field survey; generate fluid flow results for each of the scenarios for the one or more field sites; receive probabilities for at least one technical field survey criterion; and generate values, based on the fluid flow results and the probabilities, that quantify the performance of the field survey at the one or more field sites.

One or more non-transitory computer-readable storage media can include processor-executable instructions to instruct a computing system to: receive scenarios for one or more field sites, where the scenarios account for performance and non-performance of a field survey; generate fluid flow results for each of the scenarios for the one or more field sites; receive probabilities for at least one technical field survey criterion; and generate values, based on the fluid flow results and the probabilities, that quantify the performance of the field survey at the one or more field sites.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 2A, FIG. 2B, FIG. 2C and FIG. 2D illustrate examples of systems and techniques;

FIG. 8 illustrates a table of some examples of types of field surveys;

FIG. 9 illustrates an example of a graphical user interface;

FIG. 11 illustrates an example of a graphical user interface;

FIG. 12 illustrates an example of a graphical user interface;

FIG. 13 illustrates an example of a graphical user interface;

FIG. 14 illustrates an example of a graphical user interface;

FIG. 20 illustrates an example of a method and an example of a system; and

DETAILED DESCRIPTION

This description is not to be taken in a limiting sense, but rather is made merely for the purpose of describing the general principles of the implementations. The scope of the described implementations should be ascertained with reference to the issued claims.

Figure 1:
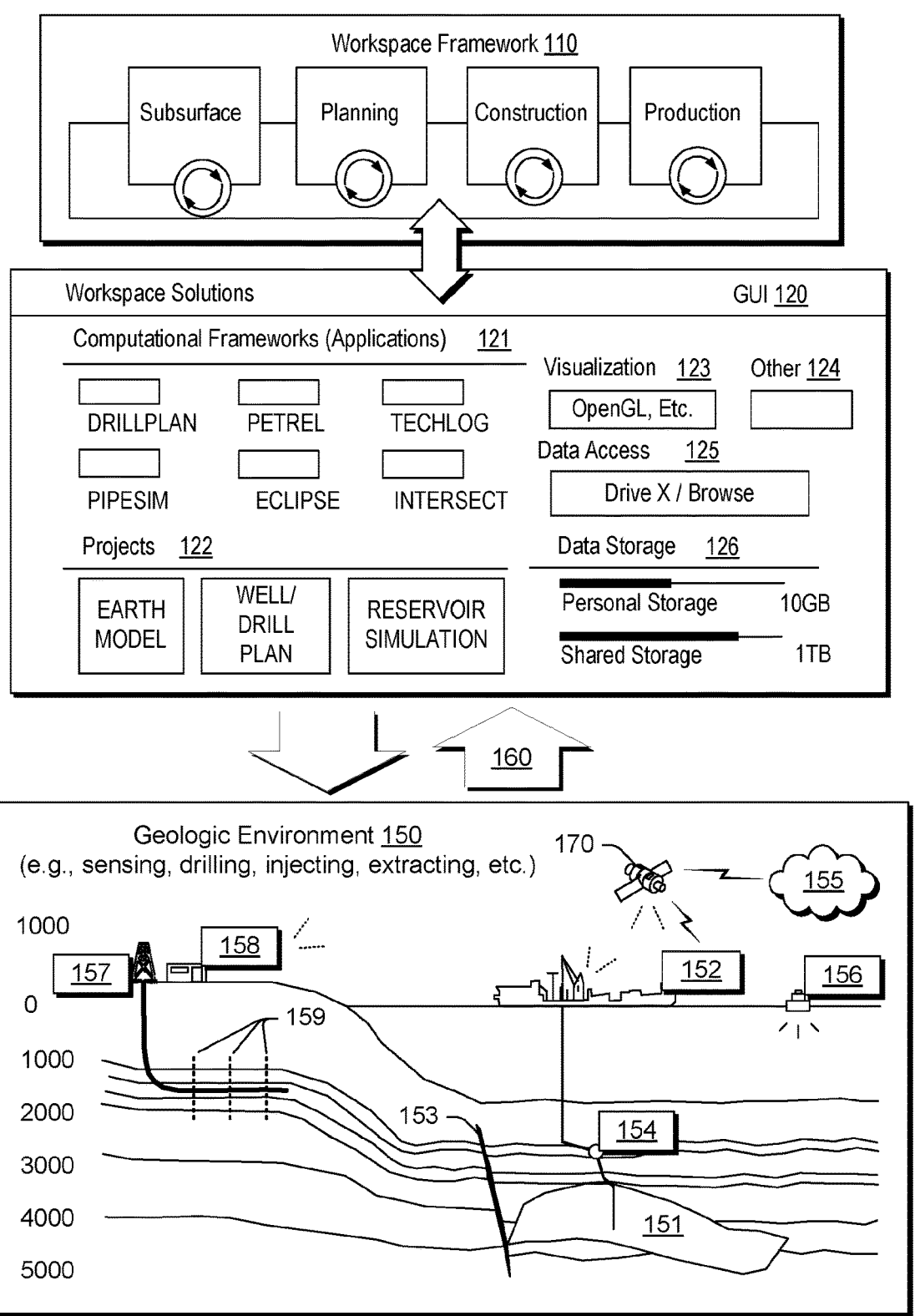
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PIPESIM, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). The PIPESIM simulator may be an optimizer that can optimize one or more operational scenarios at least in part via simulation of physical phenomena.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.). Field acquisition equipment may be utilized to acquire seismic data, which may be in the form of traces where a trace can include values organized with respect to time and/or depth (e.g., consider 1D, 2D, 3D or 4D seismic data).

A model may be a simulated version of a geologic environment where a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. While several simulators are illustrated in the example of FIG. 1, one or more other simulators may be utilized, additionally or alternatively.

FIG. 2A, FIG. 2B, FIG. 2C, and FIG. 2D illustrate approximate schematic views of a geologic environment 200 that includes a subterranean formation 202 that includes a reservoir 204. FIG. 2A shows an example of a survey operation being performed by a survey tool, such as seismic truck 206-1 that can measure properties of the subterranean formation 202. Such a survey operation can be a seismic survey operation for producing sound vibrations.

In the example of FIG. 2A, a sound vibration 212 is illustrated as being generated by a source 210 where energy reflects off horizons 214 in a portion of the geologic environment 200, particularly a formation 216. As shown, a set of sound vibrations can be received by sensors 218 (e.g., geophones). Data received 220 can be provided as input data to a computer 222-1 of the seismic truck 206-1, and responsive to the input data, the computer 222-1 can generate seismic data output 224. Such seismic data output may be stored, transmitted or further processed as desired, for example, by data reduction.

In the example of FIG. 2B, a drilling operation is shown as being performed by drilling tools 206-2 suspended by rig 228 and advanced into a subterranean formation 202 to form a wellbore 236. As shown, a mud pit 230 can be used to draw drilling mud into the drilling tools 206-2 via a flow line 232 for circulating drilling mud down through the drilling tools 206-2, then up the wellbore 236 and back to the surface. The drilling mud can be filtered and returned to the mud pit. A circulating system may be used for storing, controlling, or filtering the flowing drilling mud. The drilling tools 206-2 can be advanced into the subterranean formation 202 to reach a reservoir 204. As an example, individual wells may target one or more reservoirs. The drilling tools 206-2 can be adapted for measuring downhole properties using logging while drilling (LWD) tools. As an example, one or more logging while drilling (LWD) tools may include features for taking a core sample 233.

In the example of FIG. 2B, computer facilities may be positioned at various locations about the geologic environment 200 (see, e.g., a surface unit 234) and/or at one or more remote locations. In the example of FIG. 2B, the surface unit 234 may be used to communicate with one or more of the drilling tools 206-2 and/or offsite operations, as well as with other surface or downhole sensors. Surface unit 234 can include features for communicating with one or more of the drilling tools 206-2 to send commands thereto and/or to receive data therefrom. The surface unit 234 may collect data generated during the drilling operation and produce data output 235, which may then be stored or transmitted.

In the example of FIG. 2B, sensors (S), such as gauges, may be positioned about the geologic environment 200 to collect data relating to various oilfield operations as described previously. As shown, one or more sensors (S) are positioned in one or more locations in the drilling tools 206-2 and/or at the rig 228 to measure drilling parameters, such as weight on bit, torque on bit, pressures, temperatures, flow rates, compositions, rotary speed, and/or other parameters of the field operation. Sensors (S) may be positioned in one or more locations in the circulating system.

As an example, the drilling tools 206-2 may include a bottom hole assembly (BHA), for example, near a drill bit (e.g., within several drill collar lengths from a drill bit). A bottom hole assembly (BHA) can include capabilities for measuring, processing, and storing information, as well as communicating with the surface unit 234. A BHA can include drill collars for performing various other measurement functions.

As an example, a BHA may include a communication subassembly that communicates with the surface unit 234. For example, consider a communication subassembly that can send signals to and receive signals from the surface using a communications channel such as mud pulse telemetry, electro-magnetic telemetry, or wired drill pipe communications. Such a communication subassembly may include, for example, a transmitter that generates a signal, such as an acoustic or electromagnetic signal, which is representative of the measured drilling parameters.

As an example, a wellbore can be drilled according to a drilling plan that is established prior to drilling. A drilling plan can set forth equipment, pressures, trajectories and/or other parameters that define the drilling process for the wellsite. As an example, a drilling operation may be performed according to a drilling plan; noting that, as information is gathered, the drilling operation may deviate from the drilling plan. As an example, as drilling or other operations are performed, the subsurface conditions may change. For example, an earth model may be adjusted as new information is collected.

The data gathered by one or more sensors (S) may be collected by the surface unit 234 and/or other data collection sources for analysis or other processing. As an example, data collected by sensors (S) may be used alone or in combination with other data. As an example, data may be collected in one or more databases and/or transmitted on or offsite. As an example, data may be historical data, real time data, or combinations thereof. As an example, real time data may be used in real time, or stored for later use. As an example, data may be combined with historical data or other inputs for further analysis. As an example, data may be stored in separate databases, or combined into a single database.

In the example of FIG. 2B, the surface unit 234 may include a transceiver 237 that provides for communications between the surface unit 234 and various portions of the geologic environment 200 and/or one or more other locations. The surface unit 234 may include features to connect to one or more controllers, for example, to actuate mechanisms of equipment at the geologic environment 200. As an example, the surface unit 234 may transmit command signals to one or more pieces of equipment in response to data received. As an example, the surface unit 234 may receive commands via the transceiver 237 or, for example, it may execute commands to a controller.

As an example, one or more processors can be included locally and/or remotely as part of computing equipment that includes memory accessible by at least one of the one or more processors. Such memory can be, for example, one or more computer-readable storage media that can store processor-executable instructions. In such an example, a computer-readable storage medium can be a physical storage device that is non-transitory and not a carrier wave or a signal. As an example, computing equipment can include one or more interfaces that can receive and/or transmit information. As an example, information can include one or more control signals, for example, to control one or more pieces of equipment.

In the example of FIG. 2B, operations may be selectively adjusted based at least in part on data collected. As an example, computing equipment may be utilized to control one or more field operations such as, for example, controlling drilling, weight on bit, pump rates, and/or one or more other operational parameters. As an example, one or more adjustments may be made automatically based on computer protocol, and/or manually by an operator.

In the example of FIG. 2C, a wireline operation being performed by a wireline tool 206-3 being suspended by a rig 228 in a wellbore 236. As shown, the wireline tool 206-3 can be adapted for deployment into the wellbore 236 for generating well logs, performing downhole tests and/or collecting samples. As an example, the wireline tool 206-3 may include equipment for performing at least a portion of a seismic survey operation. As an example, a wireline tool may, for example, include an explosive, radioactive, electrical, and/or acoustic energy source 244 that can send signals to surrounding a subterranean formation 202 and fluids therein.

As an example, the wireline tool 206-3 may be operatively connected to, for example, geophones 218 and the computer 222-1 of the seismic truck 206-1 of FIG. 2A. As an example, the wireline tool 206-3 may provide data to the surface unit 234. As an example, the surface unit 234 may collect data generated during the wireline operation and may produce data output 235 that may be stored and/or transmitted. As an example, the wireline tool 206-3 may be positioned at various depths in the wellbore 236 to provide a survey and/or other information relating to the subterranean formation 202.

As an example, one or more sensors (S), such as gauges, may be positioned to collect data relating to various field operations. As shown in FIG. 2C, a sensor (S) can be positioned in the wireline tool 206-3 to measure downhole parameters which relate to, for example, one or more of porosity, permeability, fluid composition and/or other parameters of the field operation. As an example, temperature, pressure, and one or more other types of parameters may be measured using one or more wireline tools.

In the example of FIG. 2D, a production operation being performed by production tool 206-4 deployed from a production unit or Christmas tree 229 and into a completed wellbore 236 for drawing fluid from one or more downhole reservoirs into surface facilities 242. The fluid can flow from a reservoir 204 through perforations in the casing and into the production tool 206-4 in the wellbore 236 and to surface facilities 242 via a gathering network 246.

As an example, one or more sensors (S), such as gauges, may be positioned to collect data relating to various field operations. As shown, a sensor (S) may be positioned in the production tool 206-4 or associated equipment such as, for example, the Christmas tree 229, the gathering network 246, the surface facility 242, and/or the production facility, for example, to measure fluid parameters such as, for example, fluid composition, flow rates, pressures, temperatures, and/or one or more other parameters of the production operation.

As an example, production operation can include use of one or more injection wells. As an example, one or more gathering facilities may be operatively connected to one or more wellsites for selectively collecting downhole fluids from the wellsite(s).

As an example, various tools may be used in connection with non-oilfield operations, such as gas fields, mines, aquifers, storage or other subterranean facilities. As an example, various measurement tools capable of sensing parameters, such as seismic two-way travel time, density, resistivity, production rate, etc., of the subterranean formation and/or its geological formations may be used. As an example, various sensors (S) may be located at various positions along a wellbore to collect data and/or monitor one or more conditions. As an example, one or more sources of data may be provided from one or more offsite locations.

Figure 3:
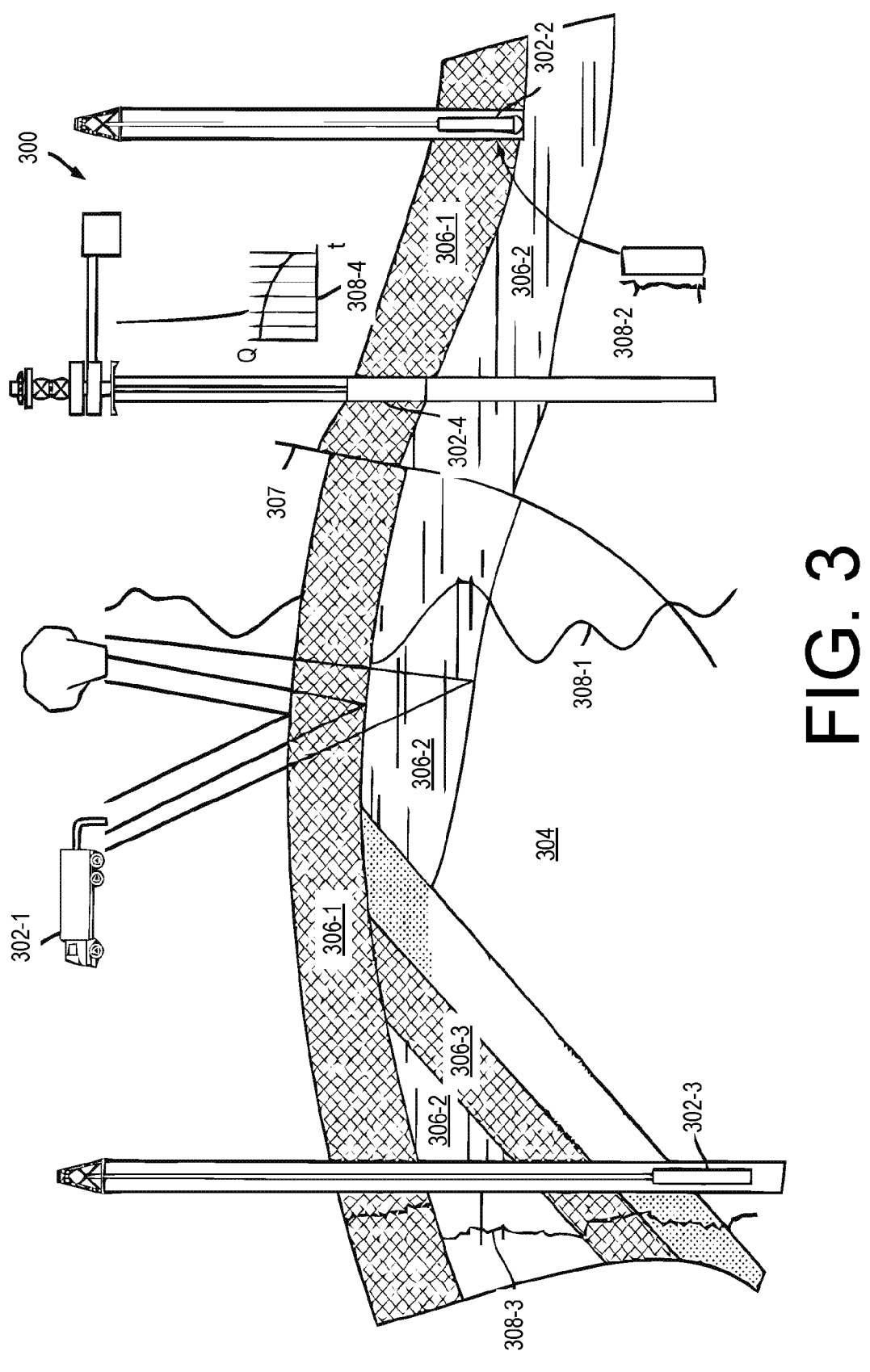
FIG. 3 illustrates examples of systems and techniques.

FIG. 3 shows an example of a schematic view, partially in cross section of a geologic environment 300 where data acquisition tools 302-1, 302-2, 302-3 and 302-4 are positioned for collecting data of a subterranean formation 304. As an example, the data acquisition tools 302-1, 302-2, 302-3 and 302-4 can correspond to tools such as those of FIGS. 2A to 2D (e.g., 206-1, 206-2, 206-3 and 206-4). As an example, one or more data acquisition tools can acquire data (e.g., plots, measurements, etc.).

In the example of FIG. 3, various examples of data plots 308-1, 308-2 and 308-3 are shown, which may be data plots (e.g., data measurements, etc.) generated by corresponding data acquisition tools 302-1, 302-2 and 302-3, respectively. Such information may be analyzed to aid in defining one or more properties, etc.

In the example of FIG. 3, the data plot 308-1 can be a seismic two-way response over a period of time; the data plot 308-2 can be core sample data measured from a core sample of a formation (e.g., used to provide data, such as a graph of the density, porosity, permeability, or some other physical property of the core sample over the length of the core). As an example, one or more tests for density and/or viscosity may be performed on fluids in a core at varying pressures and/or temperatures. As an example, the data plot 308-3 can be a log (e.g., logging trace, plot, etc.) that provides a resistivity or other measurement of a formation at various depths and/or with respect to time.

In the example of FIG. 3, a production decline curve or graph 308-4 can be a data plot of fluid flow rate over time. As an example, a production decline curve can provide production rate at various times. For example, as fluid flows through a wellbore, measurements can be taken for fluid properties such as, for example, one or more of flow rate, pressures, composition, etc.

As an example, the subterranean structure 304 of FIG. 3 can include a plurality of geological formations 306-1, 306-2, 306-3 and 306-4. As an example, consider one or more of the following types of layers, a shale layer 306-1, a carbonate layer 306-2, a shale layer 306-3 and a sand layer 306-4. As an example, a fault 307 can extend through the shale layer 306-1 and the carbonate layer 306-2.

In the example of FIG. 3, seismic data displayed in the data plot 308-1 from the data acquisition tool 302-1 can be used by a geophysicist to determine characteristics of the subterranean formations and features; core data shown in data plot 308-2 and/or log data from a well log of the data plot 308-3 may be used by a geologist to determine various characteristics of the subterranean formation; and/or production data from the plot 308-4 can be used by the reservoir engineer to determine fluid flow reservoir characteristics. As an example, data analyzed by a geologist, a geophysicist and a reservoir engineer may be analyzed using one or more modeling techniques where output therefrom may be utilized in planning and/or performing one or more field operations.

Figure 4:
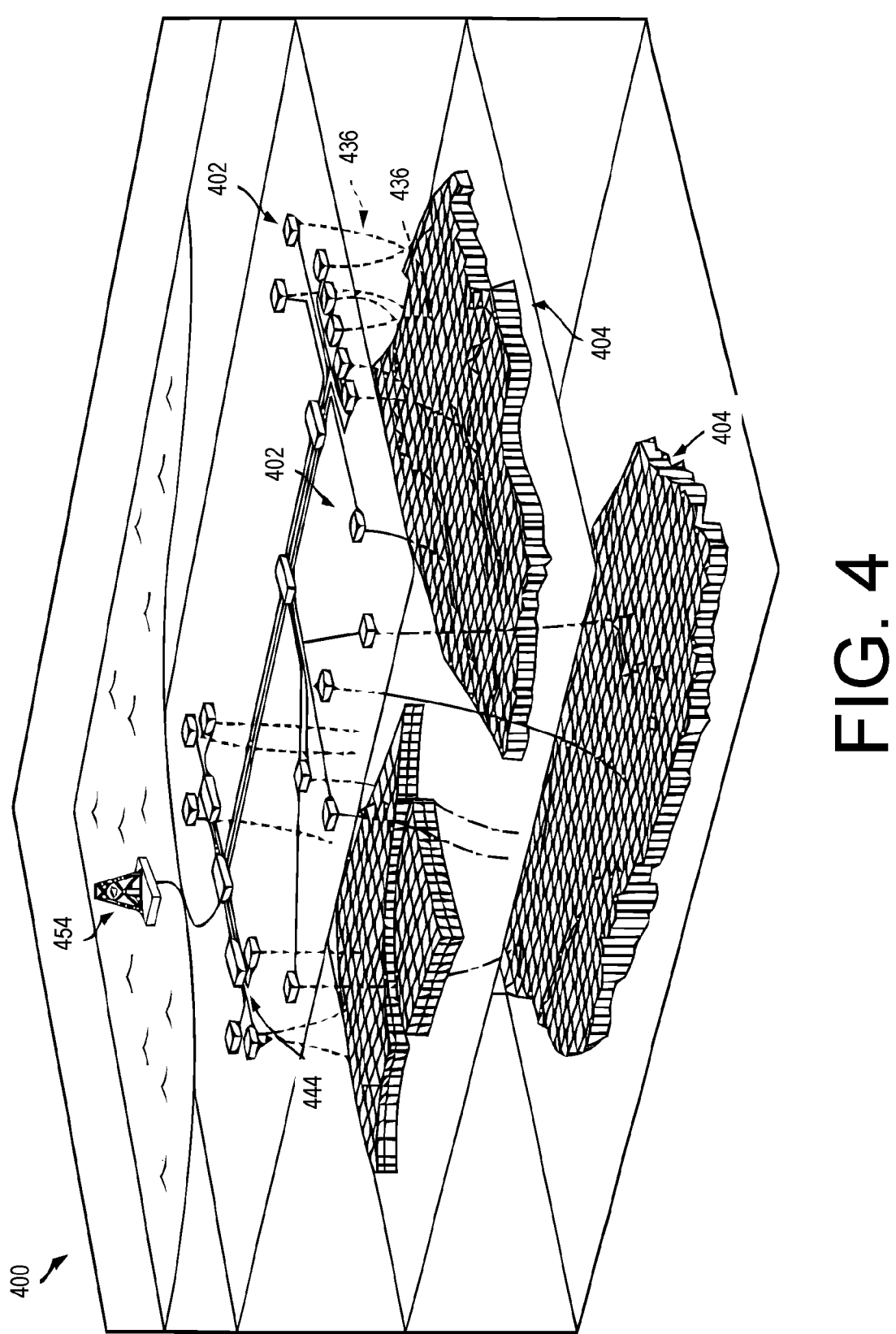
FIG. 4 illustrates an example of equipment at one or more field sites.

FIG. 4 shows an example of a geologic environment 400. As shown, the geologic environment 400 includes a plurality of wellsites 402 operatively connected to a processing facility 454. In the example of FIG. 4, individual wellsites 402 can include equipment that can form individual wellbores 436. Such wellbores can extend through subterranean formations 406 including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility.

Figure 5:
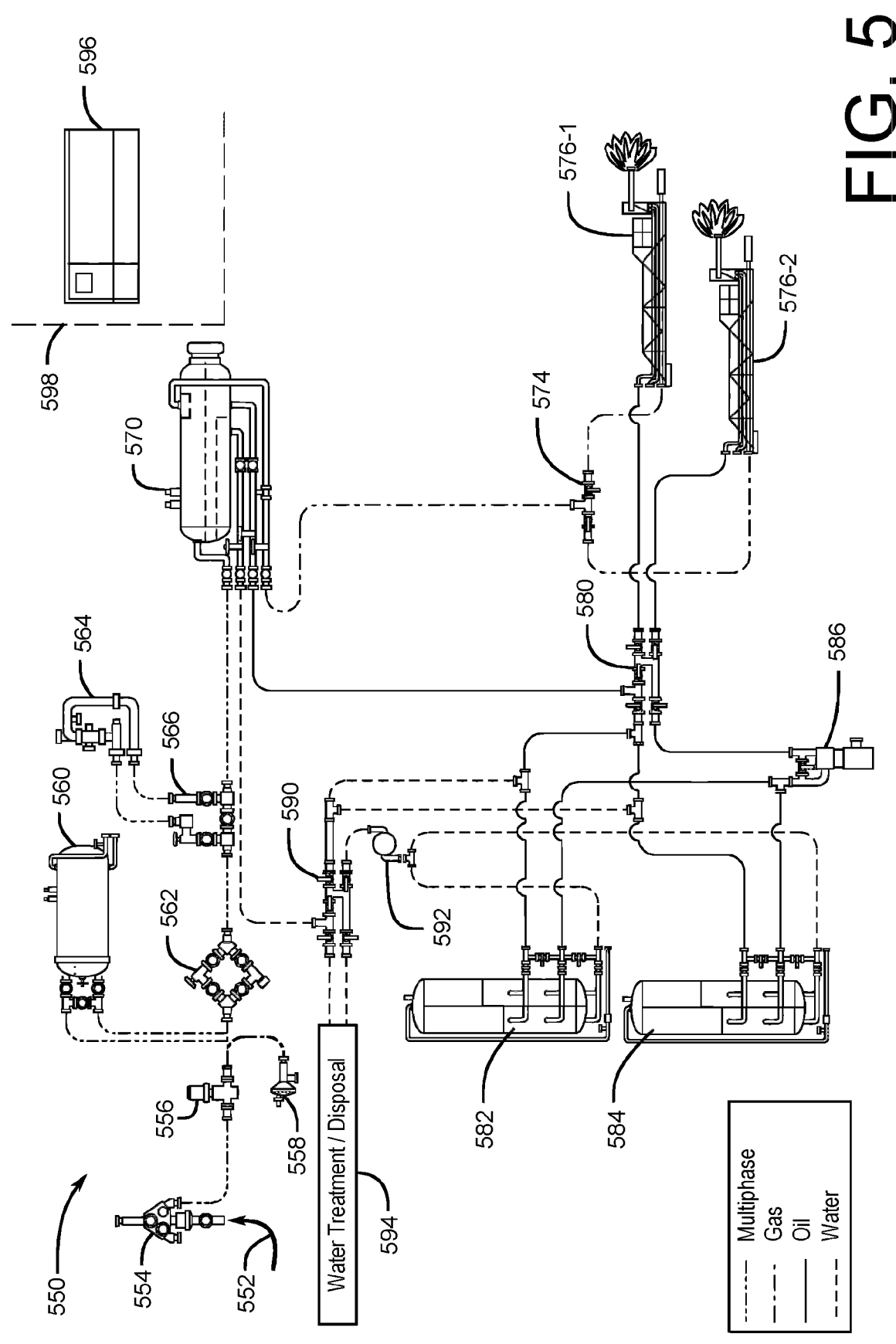
FIG. 5 illustrates an example of a system.

FIG. 5 shows an example of a system 550, which may be referred to as a surface well testing system. The system 550 can include various features of the system 100 of FIG. 1.

In FIG. 5, a multiphase fluid (represented by an arrow 552) enters a flowhead 554 and is routed to a separator 570 through a surface safety valve 556, a steam-heat exchanger 560, a choke manifold 562, a flow meter 564, and an additional manifold 566. In the example of FIG. 5, the system 550 includes a chemical injection pump 558 for injecting chemicals into the multiphase fluid flowing toward the separator 570, as may be desired.

In the example of FIG. 5, the separator 570 can be a three-phase separator that separates the multiphase fluid 552 into gas, oil, and water components. The separated gas can be routed downstream from the separator 570 through a gas manifold 574 to either of the burners 576-1 and 576-2 for flaring gas and burning oil. The gas manifold 574 includes valves that can be actuated to control flow of gas from the gas manifold 574 to one or the other of the burners 576-1 and 576-2. Although shown next to one another in FIG. 5, the burners 576-1 and 576-2 may be positioned apart from one another, such as on opposite sides of a rig, etc.

As shown in the example of FIG. 5, the separated oil from the separator 570 can be routed downstream to an oil manifold 580. Valves of the oil manifold 580 can be operated to permit flow of the oil to either of the burners 576-1 and 576-2 or either of the tanks 582 and 584. The tanks 582 and 584 can be of a suitable form such as, for example, vertical surge tanks including fluid compartments. Such an approach allows each of the tanks 582 and 584 to simultaneously hold different fluids, such as water in one compartment and oil in the other compartment. An oil transfer pump 586 may be operated to pump oil through the well testing system 550 downstream of the separator 570. The separated water from the separator 570 can be similarly routed to a water manifold 590. The water manifold 590 includes valves that can be opened or closed to permit water to flow to either of the tanks 582 and 584 or to a water treatment and disposal apparatus 594. A water transfer pump 592 may be used to pump the water.

In the example of FIG. 5, a cabin 596 at a wellsite may include various types of equipment to acquire data from the well testing system 550. These acquired data may be used to monitor and control the well testing system 550. In at least some instances, the cabin 596 can be set apart from the well test area having the well testing system 550 in a non-hazardous area. In the example of FIG. 5, a dashed line 598 indicates a demarcation between the hazardous area having the well testing system 550 and the non-hazardous area of the cabin 596.

The equipment of a well testing system can be monitored during a well testing process to verify proper operation and facilitate control of the process. Such monitoring can include taking numerous measurements by appropriate sensors during a well test, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks of a system.

As an example, a system can be configured for local and/or remote rendering of information, control, etc. For example, consider a mobile computing device such as a tablet computing device that can be operatively coupled to remote computing resources via a wired network, a wireless network, etc. In such an example, the remote computing resources may be or include a one or more cloud management platform. In such an example, a mobile computing device can include hardware suitable to execute a browser application or another type of application suitable for rendering graphical user interfaces to a display, which may be a touchscreen display.

As explained with respect to various examples in FIG. 1 to FIG. 5, operations can be performed at one or more sites that can include downhole and/or surface services. Such services demand resources and time, which may also demand halting production, drilling, construction, etc. Thus, a service may provide value in the information it can acquire at a site while also impacting activity at a site. For example, the time to perform a service can be beneficial for the service and the information that it provides; however, where another operation is halted or otherwise interrupted, the time to perform the service may be viewed as a type of non-productive time (NPT). If that time involves halting and/or diverting fluid such as, for example, hydrocarbon fluid, production time may be lost and hence production rate may be diminished.

As mentioned, various services pertain to well and/or reservoir surveillance, which can help to ensure robust well and/or reservoir management. However, data acquired as part of routine surveillance operations may or may not add an expected value. As explained, without an ability to assess value of information (VoI) of one or more services at one or more field sites, uninformed decisions may be made according to schedules and/or available resources. For example, a schedule may indicate that a certain service is to be performed at a particular well four times a year, one time every three months. In such an example, the usefulness of performing the service according to the schedule may not be known a priori. And, if data acquired by the service merely indicates that there has been no substantial change in production from the well, then the resources expended to perform the service at the well may actually diminish return for the well, particularly where production from the well may have been interrupted (e.g., halted or otherwise diminished) to perform the service. Accordingly, an approach that relies on a schedule alone may waste valuable resources and may diminish production of valuable hydrocarbons.

Another approach to value of information (VoI) evaluation involves transformation of the problem to one of risk based surveillance planning. Such an approach aims to evaluate surveillance activities based on their capability to mitigate risks by considering impact and likelihood of risk occurrence.

VoI assessments can be heavily reliant on vigorous statistical methods coupled with a vast number of simulation runs. Such assessments can be time consuming and costly due to the time it takes to assess possible scenarios and to produce probability distributions associated with each geological realization and tested parameter. An inability to assess a suitable number of possible scenarios may result in erroneous outcomes, which in turn can lead to unreliable quantification of VoI.

Given that surveillance operations (e.g., services) tend to be associated with relatively substantial costs, which could outweigh added value, it is advantageous to quantify the value of information (VoI) of surveillance operations before deciding to plan and/or to perform such surveillance operations. Where value of information (VoI) can be assessed prior to decision making and performance of services at various field sites, as described in various examples herein, resources may be better applied for purposes of achieving production goals. For example, through a VoI approach, services can be performed for targeted field sites where the value of the services can have a substantial, beneficial impact on production.

As an example, a method can provide for quantifying and optimizing the VoI of one or more services through the use of models. Such models can include proxy models, which may, for example, be relatively lightweight models in comparison to detailed simulation models. As an example, a method may involve building proxy models of hundreds of different geological realizations of a reservoir using one or more machine learning (ML) techniques. Computationally fast and reliable proxy models may be run using different uncertainty parameters to quantify VoI of each service or variable.

As an example, a workflow can enable an assessment of VoI for one or more services using a spectrum of geological realizations with rapid runtimes, as may be made possible through use of various types of proxy models. As explained, a workflow can provide for optimization. For example, an optimization engine may assess various scenarios for various services and output an optimized plan for one or more services, which may be subject to one or more constraints (e.g., time, cost, impact on production, etc.). A workflow can provide for effective screening of possible realizations to produce reliable probability distributions of a number of individual scenarios on specific parameters as to, for example, field production, to allow for quantifying VoI. As an example, one or more economic models may be built into a VoI system to quantify the VoI using one or more metrics (e.g., hydrocarbon fluid, energy, emissions, money, equipment, human resources, etc.). As an example, a system may be configured to utilize one or more of a national or regional currency, a cryptocurrency, commodity, etc., to generate a single value and/or a distribution estimate as to cost for a particular service for a particular scenario. In such an approach, cost may be a metric that can be utilized to compare, optimize, plan, perform, monitor, assess, etc., one or more services and/or outcomes thereof.

Figure 6:
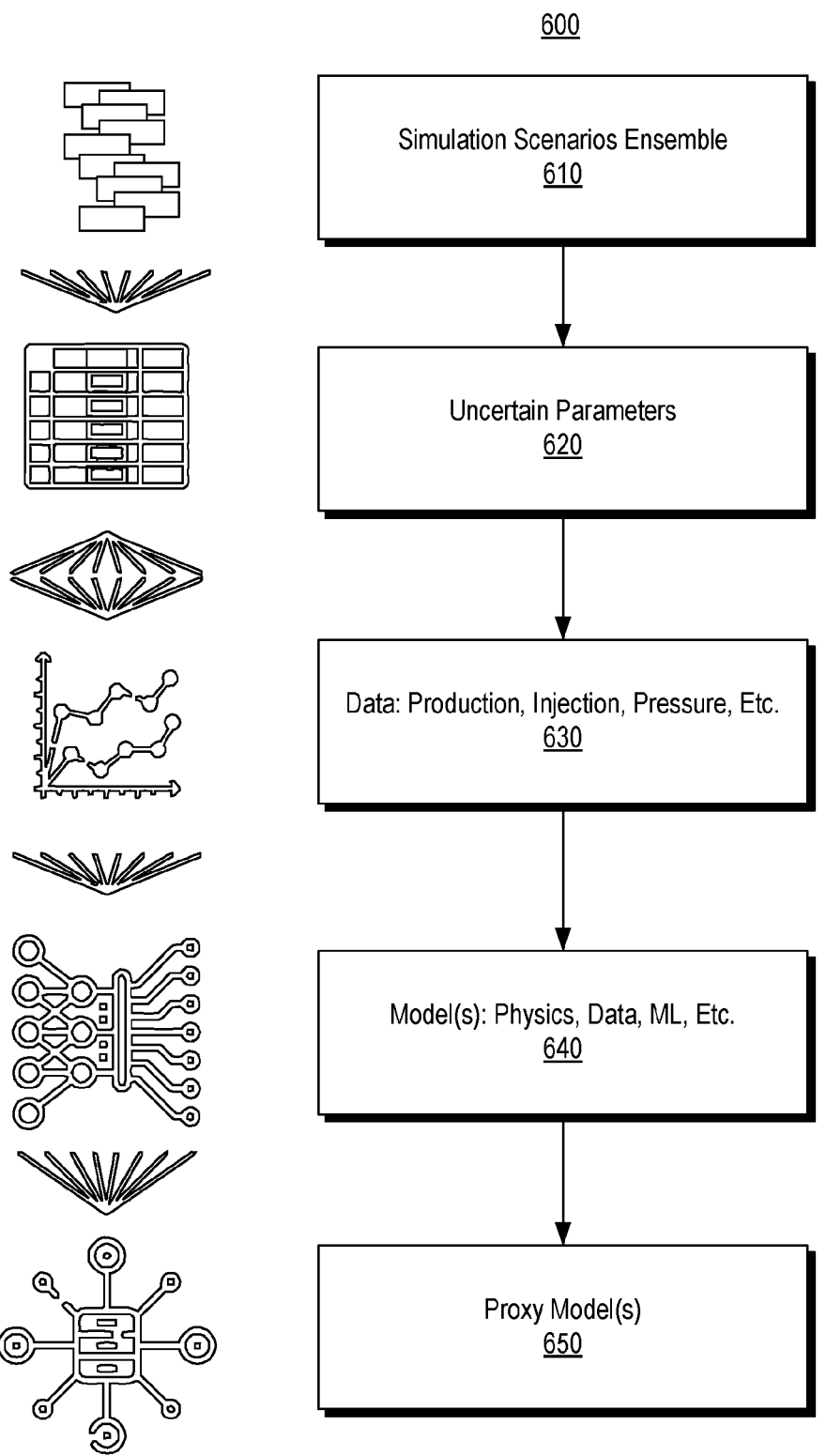
FIG. 6 illustrates an example of a method.

FIG. 6 shows an example of a method 600 that includes a simulation scenarios ensemble block 610 for receiving an ensemble of simulation scenarios, an uncertain parameters block 620 for identification of uncertain parameters, a data block 630 for using one or more types of data (e.g., production, injection, pressure, etc.), a modeling block 640 for providing and/or generating one or more types of models (e.g., physics-based, data-driven, machine learning (ML), etc.), and a proxy model block 650 for the generation and/or utilization of one or more proxy models.

As an example, the method 600 can provide for building a proxy model using one or more techniques, which may include one or more ML techniques. In such an example, the proxy model can mimic the results of a physics-based simulator, which may be a reservoir simulator (e.g., ECLIPSE, INTERSECT, etc.), a surface network simulator (e.g., PIPESIM, etc.).

As shown in the example of FIG. 6, the method 600 can identify or otherwise ingest a list of uncertain parameters per the block 620 and corresponding results of simulation scenarios of different geological ensembles per the block 610. In such an example, results of the simulation models may include parameters such as oil production rate, oil production cumulative, water production rate, water production cumulative, gas production rate, gas production cumulative, water injection rate, water injection cumulative, gas injection rate, gas injection cumulative, reservoir pressure, bottom hole pressure, etc., which may be on well and/or field levels. As explained, such types of data may be acquired using one or more services, which may be considered to be types of surveillance operations. In the example of FIG. 6, the block 640 can provide for building, training, using, etc., one or more types of ML models, which may, for example, be built at various levels (e.g., borehole, near-borehole, well, field, surface network, etc.). As an example, various models may be or include models trained using deep learning techniques where sufficient data exists, which may include actual data and/or synthetic data. In various examples, domain knowledge may be utilized, for example, in building, training, tuning, labeling, assessing, etc., activities in a model generation process. As an example, a system can include one or more model management components that can coordinate, optimize, assess, select, train, re-train, etc., one or more types of models.

Figure 7:
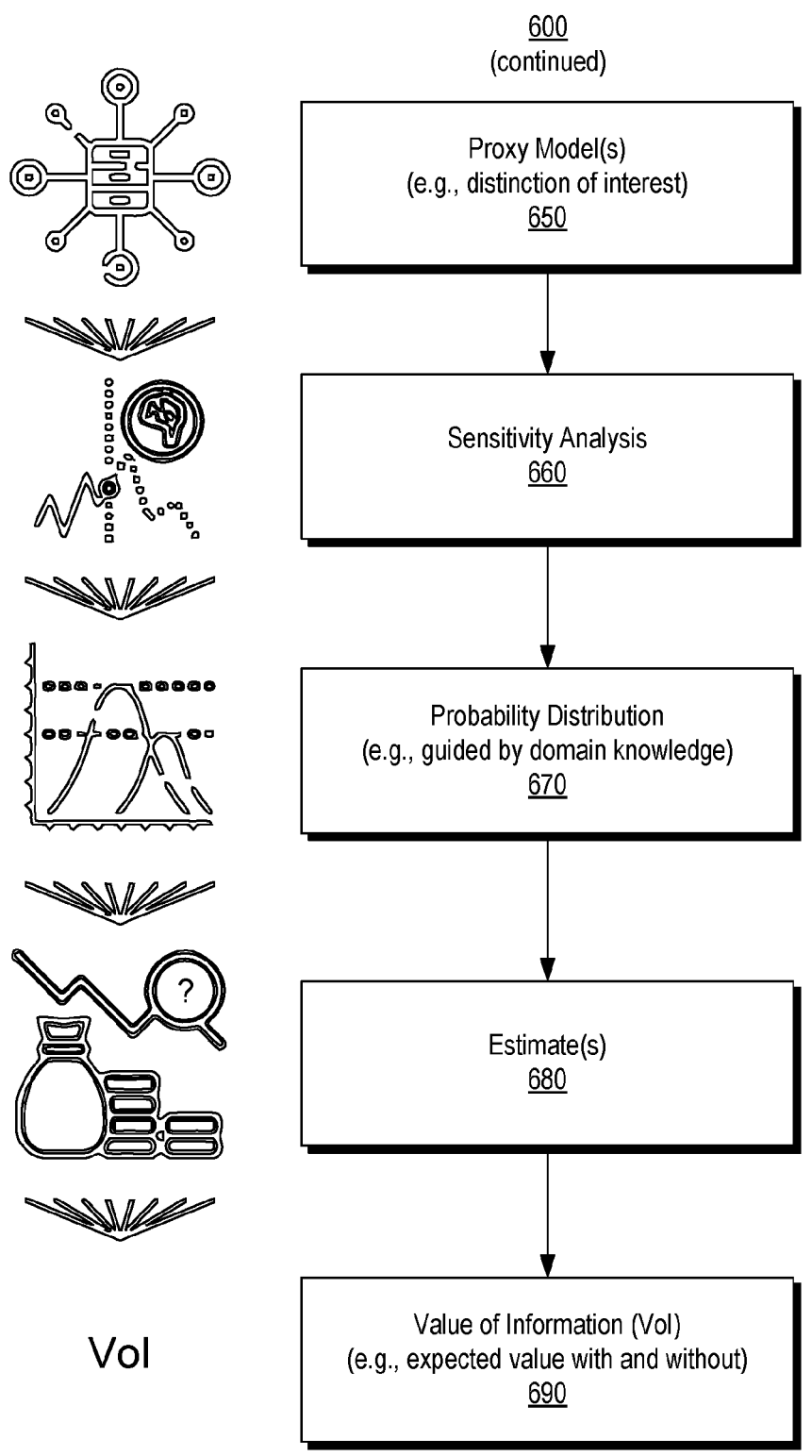
FIG. 7 illustrates an example of a method.

FIG. 7 shows various examples of actions that can continue from the proxy model block 650 of the method 600 of FIG. 6 where one or more of such actions may be part of the method 600. In the example of FIG. 7, the method 600 can continue with a sensitivity analysis block 660 for performing one or more sensitivity analyses, a probability distribution block 670 for generating one or more probability distributions as may be guided by use of domain knowledge, etc., an estimation block 680 for generating estimates, and a value of information (VoI) block 690 for generating expected VoI, for example, with a service for a scenario and without a service for a scenario.

As an example, one or more proxy models may be used to test different scenarios by varying a relevant set of uncertain parameters, for example, with respect to a distinction of interest (e.g., fault transmissibility, etc.). A proxy model may output one or more probability distributions of one or more parameters of interest using a set of uncertainty and sensitivity runs. In such an example, the impact of probability of each scenario (e.g., fault open or closed, etc.) may be assessed in terms of production rates and may be quantified using an economical model. At this stage, expected value without additional information may be considered to be estimated. However, to estimate expected value with additional information, the likelihood probability for each output may be added based on past experience and expert knowledge such as, for example, what is the probability of measuring fault transmissibility by performing a well test on a well drilled close to the fault. By using one or more proxy model probability distributions, one or more likelihood probability distributions and/or one or more economical assessments of each scenario, the expected value may be estimated with an additional information parameter. The difference between expected value with and without additional information may yield value of information of knowing some condition or conditions such as, for example, whether a fault is open or closed. Such an approach can be readily scaled from a wellbore level to a well level to a level of a number of wells to a surface network level, etc. As an example, such an approach may provide an assessment using one or more uncertain parameters to estimate value of information.

As discussed above, with the ever-increasing share of digitalization of operations, considerable volumes of data are being streamed online and available in real time. Operators and services companies tend to be quite interested in such data. However, without having VoI estimations that can justify acquisition of more data for a specific decision case.

The method 600 as shown in FIG. 6 and FIG. 7 can provide for quantifying the performance of one or more types of services for one or more scenarios, which may account for level of performance, number of instances of performance, frequency and/or other timing of performance, etc. Given such an ability to quantify, decisions can be made that can justify acquisition of data requested by an operator asset team in an optimal way.

A method such as, for example, the method 600 can provide for supporting and guiding strategic management decisions for introducing and implementing a new paradigm to service selection, service timing, service outcomes, etc., across different operator assets. Such a method can provide justification for performance of services and service-based solutions to operators using results obtained via running a method such as the method 600 to assess different scenarios. As an example, a system can include components for execution of a method such as the method 600 of FIG. 6 and FIG. 7 where the system may be offered as standalone application, software as a service (Saas), and/or as part of consultancy service.

As an example, a system can enable users to accelerate time spent on analyses, reduce cycle time, produce greater insights, and/or optimize decision making at various points in field development (e.g., from exploration to production to decommissioning, etc.) compared to a highly manual and time-consuming approach. As more and more digital data become available, data-driven solutions such as, for example, machine learning solutions, become more practical. Hence, a system can improve over time responsive to the performance of recommended services that acquire new data. Such data can be utilized for assessing, fine-tuning, re-training, etc., one or more models, which can include proxy models. In an overarching approach, a system can generate computed expected VoI values that can become more accurate and deliverable in lesser time as services are recommended and performed to generate data where such data can be utilized to assess and improve upon computed expected VoI values. Additionally, a system may provide for linking of services such that computed expected VoI values can include values for performance of two or more services in combination, which may overlap in time and/or be otherwise linked in time.

As an example, a system can be an automated scanning tool that identifies wells that demand surveillance as per reservoir surveillance guidelines and can be a tool that can perform value of information (VoI) assessments for various surveillance methods. For example, consider fluid sampling, well logging, well testing, etc., techniques that may be employed at a site to acquire data. Some examples of surveys, which may be performed as services, can include fluid sampling surveys such as bottomhole sample acquisition, geochemistry and fluid analysis, water quality and chemistry analysis, intra well and inter well tracer; well testing, well logging etc., surveys such as bottom hole closed in pressure (BHCIP), BHCIP and gradient pressure (BHCIP+GRAD), bottom hole flowing pressure (BHFP), multi-rate test (MRT), pressure build-up (PBU), pressure fall off (PFO), well head flowing pressure and temperature (WHFP, WHFT), gas-oil ratio (GOR), water cut (WCT) and interference test and/or can include logging surveys such as reservoir saturation tool (RST), production logging tool (PLT), distributed temperature sensing (DTS) and corrosion.

FIG. 8 shows a table 800 with example conveyance techniques (e.g., well logging) along with some examples of surveys, along with some examples of value of information solutions, which can include pressure data acquisition, tracer data acquisition, RST, PLT acquisition for water shut-off (WSO), and corrosion data acquisition. As an example, a system may provide for recommendation of one or more types of surveys as services that can be performed a single time and/or multiple times at one or more sites.

FIG. 9 shows an example of a graphical user interface (GUI) 900 that can be rendered by execution of a system, for example, to provide an automated scanning tool to identify wells that can benefit from surveillance, which may be based in part on various guidelines. As shown, the GUI 900 can include a load feature for loading one or more simulation cases or historical production and injection data, a selection feature for selecting a surveillance method, a definition feature for defining a period of time and/or periods of time. The selection feature may implement one or more automated advanced algorithms to identify wells meeting the guidelines. Such a GUI 900 can include an execution control that can be actuated to commence a process that can generate output such as, for example, a map of wells and/or a list of wells where, for example, a surveillance method may be associated with one or more of the wells for the time period or time periods.

As an example, a system may operate at least in part by implementing one or more decision trees. For example, various services can be cast as decision trees where each decision tree can be utilized in a VoI assessment. Such a system may provide for selection of one or more well, groups of wells, one or more surface networks, one or more portions of a surface network (e.g., optionally with one or more wells), etc. As an example, a system can include features that provide for defining and/or loading probability of success (PoS) values for one or more decisions in one or more decision trees. As an example, a system can include features that provide for defining and/or loading net present value (NPV) parameters and constraints for various simulation scenarios, which may be on a particular basis or bases (e.g., well, group, etc.). As explained, a system can provide features for execution of one or more method, which may be as one or more workflows. As explained, a system can execute one or more methods to generate results such as VoI estimates, which may include estimates with performance of a service or services and estimate without performance of a service or services. As mentioned, a system may account for scenarios where multiple services can be performed at a site and/or at related sites, which may include, for example, multiple wells in fluid communication with a common reservoir, a common surface network, a common piece of equipment, etc.

As an example, output of a system can include recommendations for the performance of one or more services at one or more sites, which may be in a digital form, optionally with instructions that can be executable to generate a plan, re-plan operations, provision resources, logically assess movements of equipment, etc. For example, output of a system may be in the form of a digital schedule that can be utilized to instruct people, equipment, regulatory agencies, etc., as to services to be performed at one or more sites. As an example, output of a system may be operatively coupled to one or more frameworks where, for example, a framework may expect data from performance of a service where such data may be utilized in one or more simulations, training one or more ML models, etc. As explained, a system may utilize one or more of various types of models, which may be fine-tuned, re-trained, etc., as data are acquired by one or more services at one or more sites.

Figure 10:
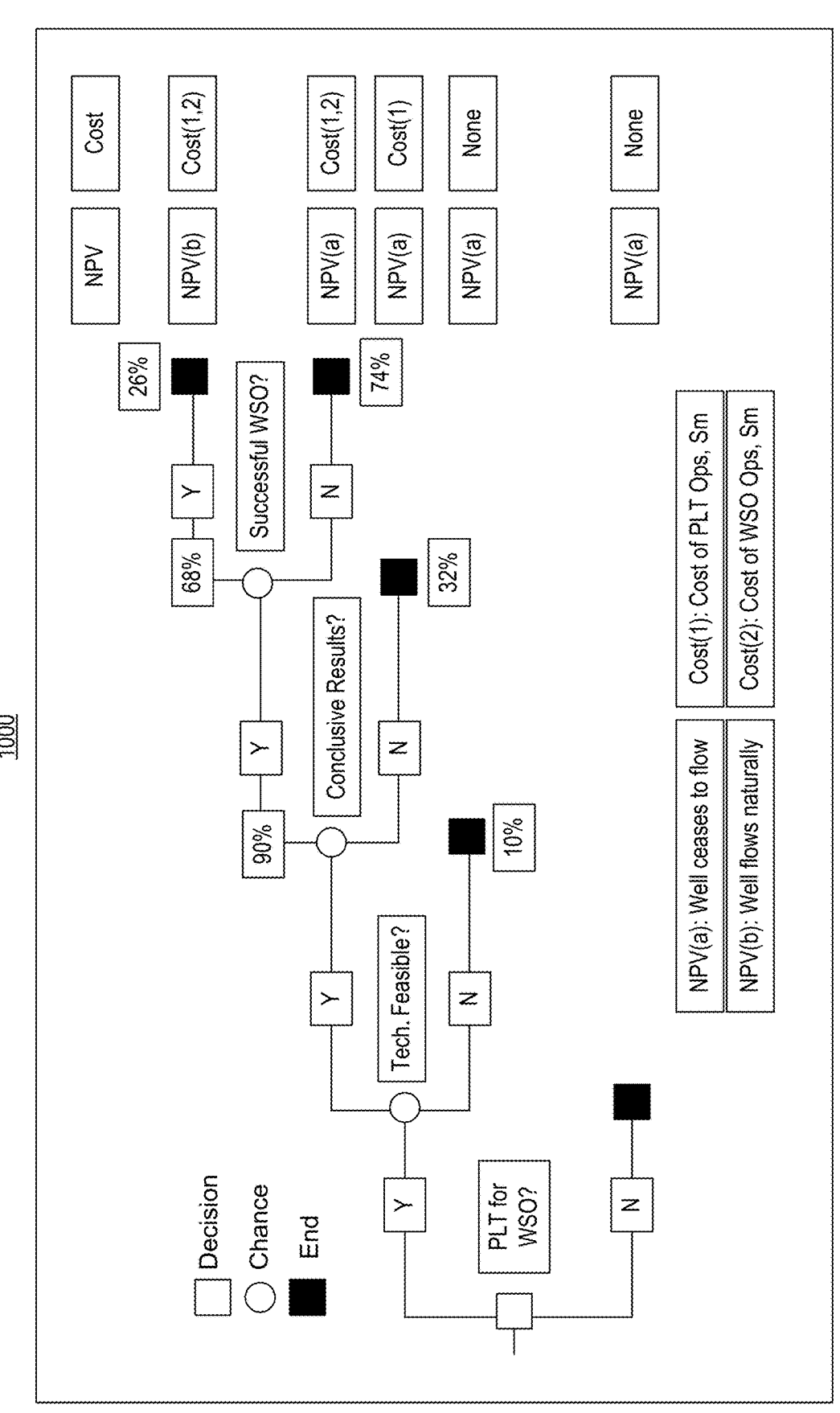
FIG. 10 illustrates an example of a decision tree.

FIG. 10 shows an example of a decision tree of a system for a particular service, shown as a production logging tool (PLT) service for a water shut-off (WSO) scenario.

Water production can present issues in oil and gas fields. If not properly managed, unwanted water production can impact economics through lost hydrocarbon production, reserves recovery and increasing treatment costs. Operational problems can arise as water demands increased capacity of water separation and handling facilities, decreases hydrocarbon production, and results in large amounts of produced water that may demand disposal in a regulated manner. For example, consider the water treatment and/or disposal block 594 of the system 550 of FIG. 5.

In various fields, water injection can give rise to an increase in water production. For example, water injection can be used for reservoir pressure maintenance, which can cause water production that demands water handling at a relatively early stage in a field life cycle. As to well types, horizontal wells have become more common in various fields. In some instances, horizontal wells can exhibit increased water cut, which may be handled by performing techniques such as rigless WSO (e.g., due to the high demand and high cost of workover rigs). For example, consider rigless WSO performed using coiled tubing to intervene and isolate one or more water producing zones (e.g., at one or more points along a wellbore), for example, through use of a tubing inflatable packer and a cement cap topped with mud push and high viscosity gel to reduce the cement slumping effect. Such a rigless WSO procedure has associated costs, which can be due to time, temporary intervention, resources, etc.

Making a decision to perform WSO, whether by rig and/or in a rigless manner, benefits from information. Hence, where water appears to be an issue, such information may be characterized as having value. As explained, information may be acquired through performing one or more types of surveys, which may be types of services. In some instances, a service performed at one site may generate information that can be utilized at one or more other sites. For example, if a service provides information that can be valuable in making a decision for WSO at one wellsite, that information may be valuable in making a decision for WSO at a neighboring wellsite; noting that information acquired can be utilized to improve a system where, for example, such information may be utilized for training, re-training, etc., one or more ML models, etc.

As shown in the example of FIG. 10, the decision tree 1000 has a particular structure with particular types of associated information. The decision tree 1000 includes a start point, a decision point, and various chance points that ultimately progress to end points. The decision tree 1000 can be structured according to various questions. For example, "Conduct PLT for WSO?", "Technically Feasible?", "Conclusive Results?", and "Successful WSO?". The first question pertains to the decision to conduct the PLT service for purposes of WSO. The second question pertains to a probability (e.g., likelihood) that the PLT service is technically feasible at the site. The third question pertains to results of the PLT service at the site and whether they will be conclusive. The fourth question pertains to whether WSO will be successful at the site.

In the example of FIG. 10, the decision tree 1000 has associated net present value (NPV) scenarios, specifically, the well ceases to flow and the well flows naturally. Additionally, the decision tree 1000 has associated costs, which are characterized as the cost of the PLT service and the cost of the WSO operation. As shown in FIG. 10, each end point has an associated NPV and an associated cost. The decision tree 1000 can provide for a detailed assessment of the PLT service with respect to WSO at a site.

As an example, a method can include generating a decision tree that includes a decision point for performance and non-performance of a field survey that branches to a chance point associated with one of at least one technical field survey criterion, where the chance point includes chance point branches, and where each of the chance point branches includes a respective probability. In such an example, the decision tree can include multiple end points associated with performance of the field survey, where each of the multiple end points includes at least one value that is a generated value, based on fluid flow results and one or more probabilities, that quantifies performance of the field survey at one or more field sites. As to probabilities, these may be stored in a database for past operations. For example, as to a PLT service as a type of field survey, a database can include one or more probabilities related to performance of the PLT service at a number of field sites. In such an approach, the probabilities may relate to difficulty, ease, success, failure, etc., of one or more aspects of performing the PLT service. As such a service is performed at one or more other field sites, information in the database may be updated (e.g., revised, etc.). For example, consider a database that includes various factors for various services where statistical and/or probabilistic techniques are utilized to compute metrics that can be utilized to determine a value of information for performance and/or non-performance of a service. As an example, a method may include automatically populating a decision tree based on specifics of a service, a field site, etc., where the method includes accessing a database to retrieve probabilities.

As shown in the example of FIG. 10, the decision tree 1000 includes a decision point for the PLT service (e.g., a field survey) and three chance points for technical field survey criteria (e.g., technically feasible, conclusive results, and successful WSO), where each of the chance points branches to one or more end points that include at least one value (e.g., an NPV and/or a cost). As shown, each branch of each chance point can be associated with a probability, which, for example, may be a probability that is based on historical data for one or more field operations (e.g., PLT, WSO, etc.). As an example, a technical field survey criterion may include one or more sub-criteria. In such an example, the one or more sub-criteria may have an associated probability, which may be, for example, based on historical data for one or more field operations. As an example, a probability of success (PoS) for a technical field criterion can be based on a number of probabilities for a number of sub-criteria (e.g., one or more sub-criteria).

As explained, a system may utilize one or more decision trees in assessing one or more services for one or more sites. As an example, another decision tree such as the decision tree 1000 or other type of decision tree may be part of a workflow that can ultimately provide an optimized recommendation for one or more services to be performed at one or more sites.

FIG. 11 shows an example of a GUI 1100 that includes various features for defining what is a probability of success (PoS). As shown, the GUI 1100 can include options such as an option to create a new well and an option to utilize a simulator (e.g., reservoir simulation of one or more wells, simulation of one or more surface operations, etc.). As shown, the GUI 1100 can include features for input of one or more criteria as associated with a branch point (chance point) such as whether a service is technically feasible. In the example of FIG. 11, criteria are shown as including wellbore accessibility, risk of well ceasing to flow during a PLT service, and aspects of well trajectory. Adjacent to these criteria are probability of success (PoS) fields, which may be populated automatically and/or manually. As an example, PoS values for various features may be subject to historical success data for particular surveillance method for reservoir or field of interest.

As shown in the example of FIG. 11, fields for the chance points for conclusive results and successful WSO can also be included in the GUI 1100. As an example, a GUI such as the GUI 1100 can be utilized to generate parameters for creation of a decision tree such as, for example, the decision tree 1000 of FIG. 10. As mentioned, PoS values can depend on historical success data for particular surveillance method for reservoir or field of interest. For example, consider results for WSO that may account for reservoir condition, production string and/or hole conditions, location of water production interval(s), and horizontal section length. As shown, conditions, characteristics, etc., can range from higher PoS to lower PoS. For example, as length of a horizontal section increases, the PoS can decrease. Further, PoS may be higher for a toe of a well water production interval compared to a heel or middle of a well water production interval.

FIG. 12 shows an example of a GUI 1200 that include various features for a batch load of PoS for a number of wells. In the example of FIG. 12, the columns can include PoS values for individual criteria (e.g., sub-criteria) as shown, for example, in the GUI 1100 of FIG. 11. As shown, an upload feature may be provided to access and upload data into a system. For example, consider a database that can store information for various scenarios, fields sites, etc., which, as explained, may include historic information relating to performance of one or more services at one or more field sites. In such an example, a user may specify or otherwise select a service or services to be considered for a field that includes a number of field sites where one or more databases can be accessed automatically to retrieve information that can be suitable for populating various entries germane to a VoI assessment. As an example, information for a field or a number of field sites may be stored to a database where a system may periodically run a VoI assessment that can make recommendations for future services for the field. For example, consider a database that can store information for services and field sites that can be updated after prior decisions for performance of services and/or non-performance of services where such updates can be utilized for future VoI assessments. In such an approach, demand on user time may be reduced once an initial VoI assessment has been run for the field. For example, consider time being reduced to consider one or more additional services to be included in the VoI assessment where such one or more additional services may not have been included in a prior VoI assessment.

FIG. 13 shows an example of a GUI 1300 for defining NPV, which as mentioned, can be associated with various end points of a decision tree (see, e.g., the decision tree 1000 of FIG. 10). In the example of FIG. 13, the GUI 1300 includes features for defining production profile scenarios, selecting one or more methods to estimate production (e.g., analytical, simulation, proxy model, etc.), selecting one or more wells, configuring a method (e.g., analytical, simulation, proxy model, etc.), inputting NPV parameters such as initial costs, production data, etc. As shown, the scenarios include well ceases to flow and well flows naturally, as explained with respect to the example decision tree 1000 of FIG. 10.

FIG. 14 shows an example of a GUI 1400 for batch loading of NPV computation parameters for one or more wells. In the example of FIG. 14, the techniques selected include an analytical method and reservoir simulation. In both instances, the scenarios well ceases to flow and well flows naturally are included.

As explained, a decision tree can be a type of data structure that can be defined and used by a system when generating recommendations for one or more services at one or more sites. While the example decision tree 1000 of FIG. 10 pertains to PLT and WSO, one or more other types of data structures, etc., may be defined and used by a system.

Figure 15:
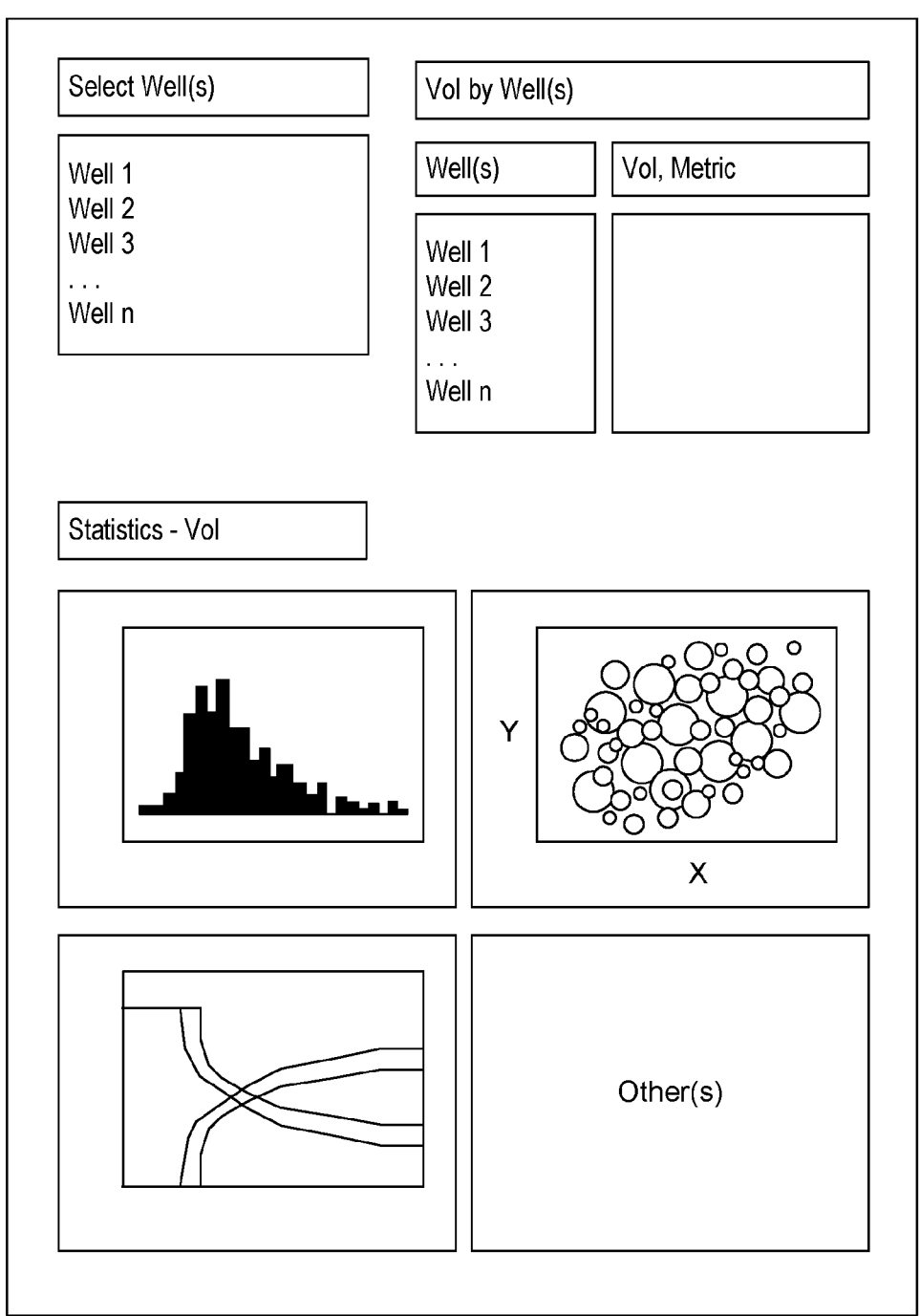
FIG. 15 illustrates an example of a graphical user interface.

FIG. 15 shows an example of a GUI 1500 that includes results of VoI estimates for one or more wells. In the example of FIG. 15, the GUI 1500 can include a selection feature for selecting one or more wells where, for example, numeric metrics can be rendered that show VoI for each of the selected wells. As shown, the GUI 1500 can provide for rendering statistics and/or other assessments based on VoI.

For example, consider a bar chart, a plot of wells and their locations with indicia of VoI per well for one or more types of services, plots of production of hydrocarbons (oil and/or gas) and/or water, etc.

Figure 16:
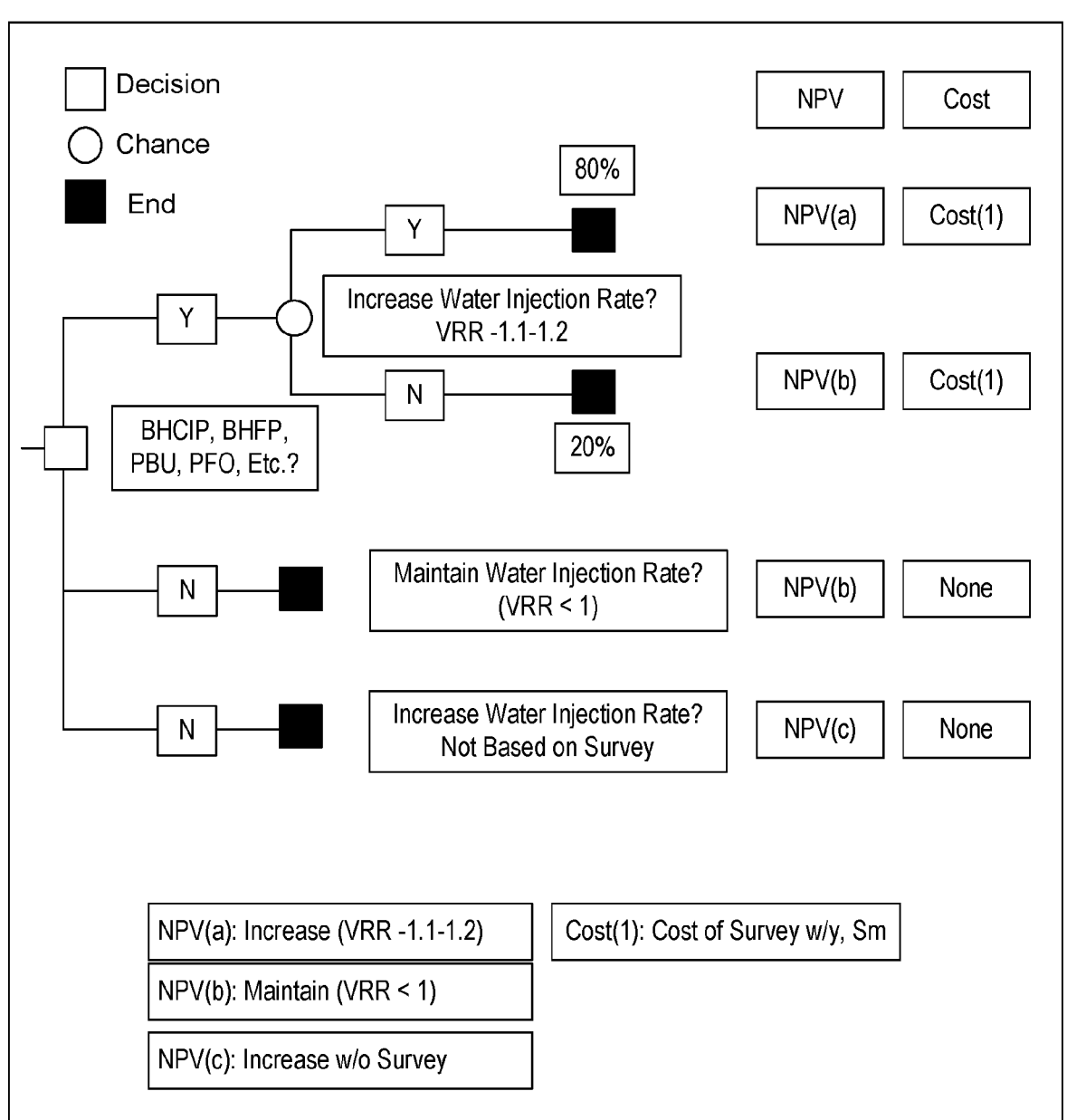
FIG. 16 illustrates an example of a decision tree.

FIG. 16 shows an example of a decision tree 1600 for one or more types of services that may be performed to provide information for scenarios pertaining to increasing water injection rate.

As explained, in various types of fields and/or wells, water may be injected as part of an operational plan to move hydrocarbon fluids. An operation known as water flooding or waterflooding can be performed for an oil reservoir in an effort to increase oil-production rate and, ultimately, oil recovery. Water flooding can cause voidage replacement where injection of water increases reservoir pressure to some level (e.g., an initial level) and maintains it near that pressure. As water flows, it can displace oil from pore spaces where efficiency of such displacement can depends on various factors (e.g., oil viscosity and rock characteristics).

A metric that may be utilized during a waterflooding stage is the voidage replacement ratio (VRR). VRR is defined as the volume of injected fluid to the volume of the produced fluid. VRR helps with comprehension of injection and production balance as it affects pressure distribution within a reservoir and production rate for one or more wells. In various instances, complete voidage replacement may be assumed to be optimal for various types of reservoirs such that maximum oil recovery is assumed to be generated when the amount of fluid injected equals the amount of oil produced. However, employing a VRR less than 1 and/or employing a VRR greater than 1 may be appropriate in some instances.

In the example of FIG. 16, services include bottom hole closed in pressure (BHCIP), bottom hole flowing pressure (BHFP), pressure build-up (PBU) and pressure fall off (PFO), noting that one or more other services may be considered, alternatively or additionally.

Figure 17:
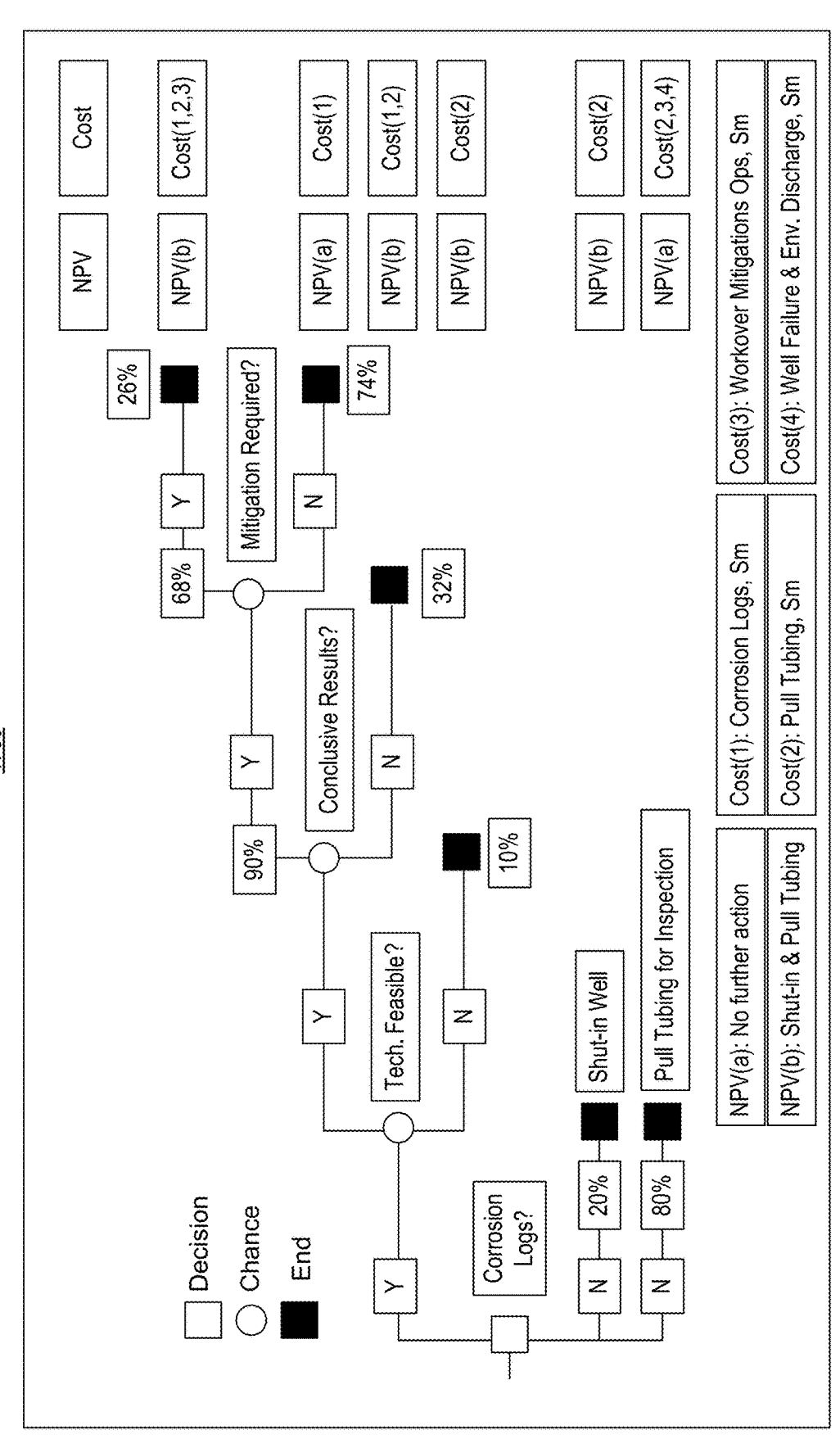
FIG. 17 illustrates an example of a decision tree.

FIG. 17 shows an example of a decision tree 1700 for one or more types of services that may be performed to provide information for scenarios pertaining to monitoring of tubing/casing conditions for corrosion using corrosion logs that includes scenarios such as no further action and shut-in well and/or pulling tubing for inspection. As shown, various NPVs and costs can be associated with end points that stem from decision points and/or chance points. In particular, four costs are shown for various operations.

Figure 18:
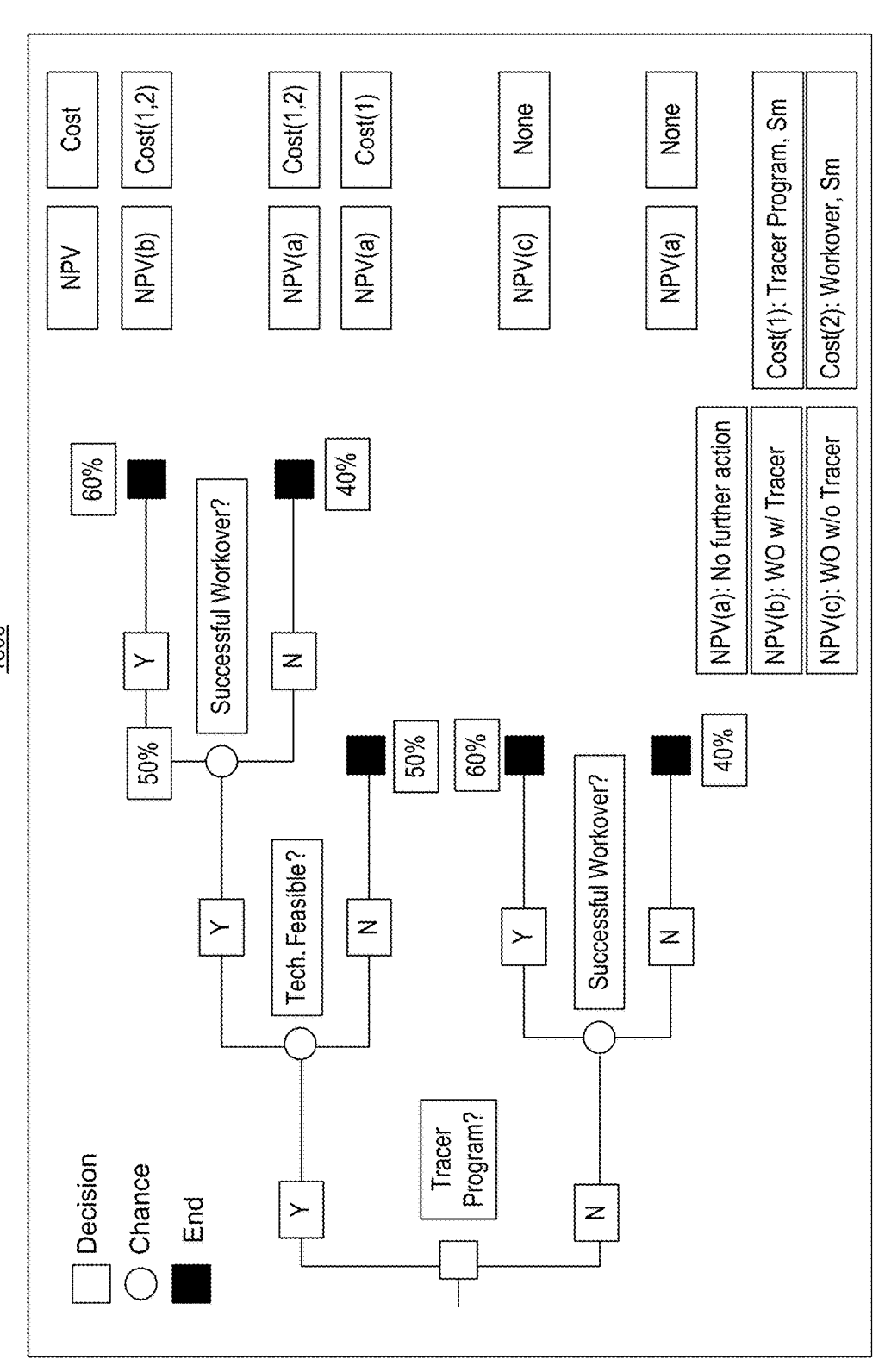
FIG. 18 illustrates an example of a decision tree.

FIG. 18 shows an example of a decision tree 1800 for one or more types of services that may be performed to provide information for scenarios pertaining to optimizing production and injection of wells using tracer injection program that includes scenarios such as no further action, workover (WO) with tracer, and workover (WO) without tracer. As shown, various NPVs and costs can be associated with end points that stem from decision points and/or chance points. In particular, four costs are shown for various operations. In particular, two costs are shown, one for performing a tracer program and another for performing workover operations.

Figure 19:
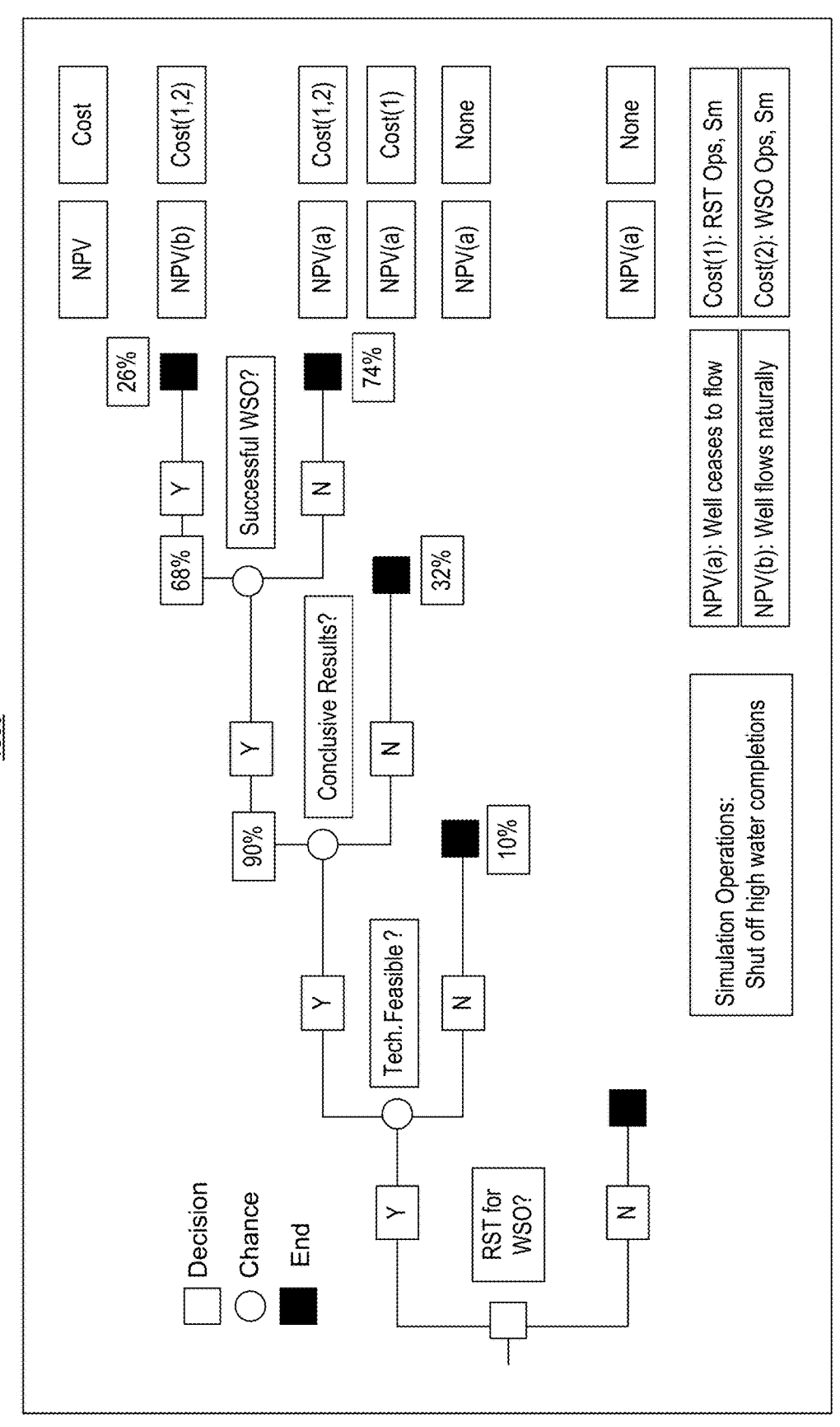
FIG. 19 illustrates an example of a decision tree.

FIG. 19 shows an example of a decision tree 1900 for one or more types of services that may be performed to provide information for scenarios pertaining to WSO and use of an RST survey (e.g., a RST service). As shown, various NPVs and costs can be associated with end points that stem from decision points and/or chance points. In particular, two costs are shown for various operations. In particular, two costs are shown, one for performing a performance of a RST survey and another for performing WSO operations.

FIG. 20 shows an example of a method 2000 and an example of a system 2090. As shown, the method 2000 can include a reception block 2010 for receiving scenarios for one or more field sites, where the scenarios account for performance and non-performance of a field survey; a generation block 2020 for generating fluid flow results for each of the scenarios for the one or more field sites; a reception block 2030 for receiving probabilities for at least one technical field survey criterion; and a generation block 2040 for generating values, based on the fluid flow results and the probabilities, that quantify the performance of the field survey at the one or more field sites.

The method 2000 is shown in FIG. 20 in association with various computer-readable media (CRM) blocks 2011, 2021, 2031, and 2041. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 2000. As an example, a computer-readable medium (CRM) may be a computer-readable storage medium that is non-transitory and that is not a carrier wave. As an example, one or more of the blocks 2011, 2021, 2031, and 2041 may be in the form processor-executable instructions.

In the example of FIG. 20, the system 2090 includes one or more information storage devices 2091, one or more computers 2092, one or more networks 2095 and instructions 2096. As to the one or more computers 2092, each computer may include one or more processors (e.g., or processing cores) 2093 and memory 2094 for storing the instructions 2096, for example, executable by at least one of the one or more processors 2093 (see, e.g., the blocks 2011, 2021, 2031 and 2041). As an example, a computer may include one or more network interfaces (e.g., wired or wireless), one or more graphics cards, a display interface (e.g., wired or wireless), etc.

As explained, a system may utilize one or more machine learning (ML) models. As to some examples of types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, Ada-Boost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

As an example, a method can include receiving scenarios for one or more field sites, where the scenarios account for performance and non-performance of a field survey; generating fluid flow results for each of the scenarios for the one or more field sites; receiving probabilities for at least one technical field survey criterion; and generating values, based on the fluid flow results and the probabilities, that quantify the performance of the field survey at the one or more field sites.

As an example, a method may be implemented by a system, which may be a computational framework, a framework environment, etc. As an example, a system may include features for automated scanning of scenarios for field surveys to identify field sites (e.g., wells, surface facilities, etc.) that can benefit from surveillance based on specified guidelines or guidance. As an example, a system may operate as an automated tool that assesses value of information for different services (e.g., reservoir surveillance techniques) for a number of field sites (e.g., wells, surface facilities, etc.) using one or more of analytical, physics-based reservoir simulation, physics-based surface network simulation, machine learning models, ML-based proxy models, etc.

As an example, a system may utilize a particular model or particular models in a manner that depends on urgency, available computational resources, etc. For example, if resources and/or time are not limiting, a physics-based model may be utilized; whereas, if resources and/or time are limiting, another approach may be utilized such that scenarios can be analyzed in an expedited manner. As explained, a cloud platform may include computational resources suitable for model execution. As an example, a method can include provisioning such resources such that determinations as to field surveys for field sites can be made in an expedited manner.

As an example, a method can include receiving scenarios that specify a start time and an end time, where one or more field sites produce hydrocarbons at the start time and at the end time, and where fluid flow results include fluid flow results for at least the end time. In such an example, values that quantify performance of a field survey can account for at least the fluid flow results at the end time. For example, scenarios can pertain to performance and non-performance of the field survey where the field survey may aim to increase hydrocarbon production at an end time, which may be determined, for example, through use of one or more predictive techniques, which can include one or more of analytical techniques, simulation techniques (e.g., physics-based, etc.), and machine learning model-based techniques.

As an example, a method can include generating values that quantify non-performance of a field survey at one or more field sites, and further include deciding whether to perform the field survey at one of the one or more field sites based on a comparison of the values that quantify performance and non-performance of the field survey.

As an example, a method can include, responsive to performance of a field survey, acquiring data and updating a model for at least one of one or more field sites using at least a portion of the data. For example, consider a model that may be a machine learning model that can be trained and/or re-trained using such acquired data. As an example, data may be acquired during and/or after performing a field survey where the data are germane to one or more probabilities such that an update may occur (e.g., to a database of probabilities, etc.).

As an example, a method can include generating fluid flow results utilizing a model. For example, consider utilizing a trained machine learning model. As mentioned, a proxy model may be utilized. As an example, one or more of an analytical model, a reservoir simulation model, a surface network simulation model, and a machine learning model may be utilized for generating fluid flow results.

As an example, a method can include accessing at least one probability from a database. For example, consider a database that includes probabilities for historical success associated with one or more technical field survey criterion for a field survey. In such an example, the database may be updated as additional field surveys are performed. As explained, a probability can be associated with a field survey and a field site, where the field survey may involve using particular equipment, particular techniques, etc., and where the field site may have certain characteristics that may impact a probability for a field survey.

As an example, a method can include using at least one technical field survey criterion where, for example, a technical feasibility criterion may be used. In such an example, a technical feasibility criterion may depend on a number of sub-criteria, which may include at least one sub-criterion that accounts for a physical characteristic of each of one or more field sites.

As an example, a field survey may involve a downhole field survey and/or may involve a surface field survey. As explained, wells and/or surface facilities may be considered as field sites for performing a field survey. As explained, a field survey may involve disposing equipment in a wellbore and/or operating surface equipment (e.g., a logging truck, fluid samplers, fluid meters, etc.). As an example, a field survey may provide information that can improve operations of a well and/or surface equipment (e.g., consider surface equipment of a surface network).

As an example, a method can include generating values by accounting for energy expended for performance of a field survey at each of one or more field sites and energy generated by production of hydrocarbons at each of the one or more field sites. In such an example, a value can depend on energy expended and energy produced (e.g., inherent energy value of hydrocarbons produced). In such an approach, a value may be quantified using chemistry and/or physics.

As an example, a method can include deciding whether to perform a field survey in a manner where such deciding depends at least in part on energy expended to perform a field survey and energy generated by production of hydrocarbons.

As an example, a method can include generating a decision tree that includes a decision point for performance and non-performance of a field survey that branches to a chance point associated with one of at least one technical field survey criterion, where the chance point includes chance point branches, and where each of the chance point branches includes a respective probability. In such an example, the decision tree can include multiple end points associated with performance of the field survey, where each of the multiple end points includes at least one value that is a generated value, based on fluid flow results and one or more probabilities, that quantifies performance of the field survey at one or more field sites.

As an example, a system can include one or more processors; a memory accessible to at least one of the one or more processors; processor-executable instructions stored in the memory and executable to instruct the system to: receive scenarios for one or more field sites, where the scenarios account for performance and non-performance of a field survey; generate fluid flow results for each of the scenarios for the one or more field sites; receive probabilities for at least one technical field survey criterion; and generate values, based on the fluid flow results and the probabilities, that quantify the performance of the field survey at the one or more field sites.

As an example, one or more non-transitory computer-readable storage media can include processor-executable instructions to instruct a computing system to: receive scenarios for one or more field sites, where the scenarios account for performance and non-performance of a field survey; generate fluid flow results for each of the scenarios for the one or more field sites; receive probabilities for at least one technical field survey criterion; and generate values, based on the fluid flow results and the probabilities, that quantify the performance of the field survey at the one or more field sites.

As an example, a computer program product can include one or more computer-readable storage media that can include processor-executable instructions to instruct a computing system to perform one or more methods and/or one or more portions of a method.

Figure 21:
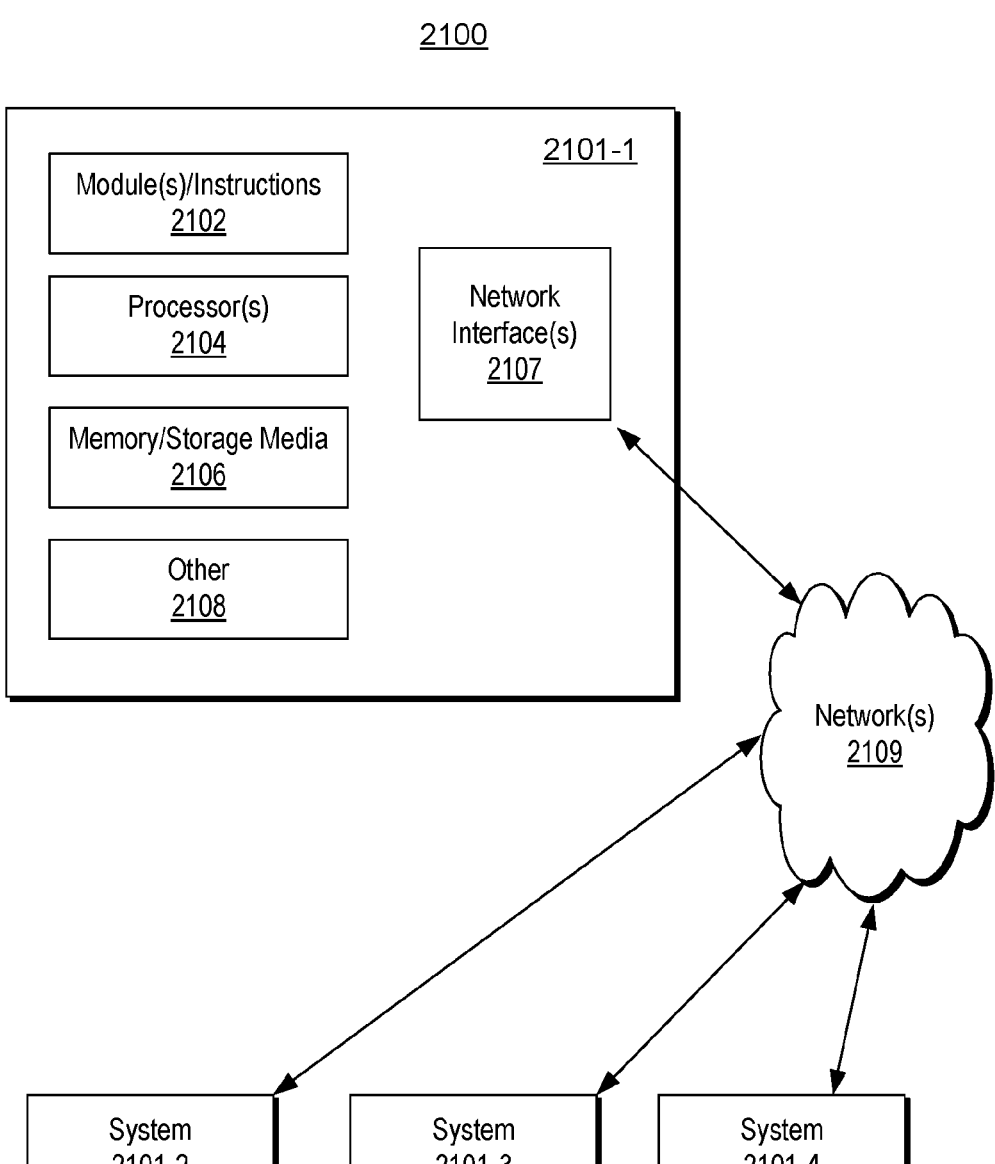
FIG. 21 illustrates examples of computer and network equipment.

In some embodiments, a method or methods may be executed by a computing system. FIG. 21 shows an example of a system 2100 that can include one or more computing systems 2101-1, 2101-2, 2101-3 and 2101-4, which may be operatively coupled via one or more networks 2109, which may include wired and/or wireless networks.

As an example, a system can include an individual computer system or an arrangement of distributed computer systems. In the example of FIG. 21, the computer system 2101-1 can include one or more modules 2102, which may be or include processor-executable instructions, for example, executable to perform various tasks (e.g., receiving information, requesting information, processing information, simulation, outputting information, etc.).

As an example, a module may be executed independently, or in coordination with, one or more processors 2104, which is (or are) operatively coupled to one or more storage media 2106 (e.g., via wire, wirelessly, etc.). As an example, one or more of the one or more processors 2104 can be operatively coupled to at least one of one or more network interfaces 2107; noting that one or more other components 2108 may also be included. In such an example, the computer system 2101-1 can transmit and/or receive information, for example, via the one or more networks 2109 (e.g., consider one or more of the Internet, a private network, a cellular network, a satellite network, etc.).

As an example, the computer system 2101-1 may receive from and/or transmit information to one or more other devices, which may be or include, for example, one or more of the computer systems 2101-2, etc. A device may be located in a physical location that differs from that of the computer system 2101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EE-PROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAS, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method, comprising:
   receiving sensor data from physical sensors deployed at one or more field sites, the sensor data comprising one or more of: choke manifold temperature, choke manifold pressure, heat exchanger temperature, heat exchanger pressure, separator temperature, separator pressure, oil flow rate from the separator, oil flow volume from the separator, water flow rate from the separator, water flow volume from the separator, or fluid levels in tanks of a system at the one or more field sites, the sensor data being acquired in real-time from the physical sensors during a production operation of the one or more field sites;
   receiving scenarios for the one or more field sites, each scenario including corresponding versions for performance of a field survey and non-performance of the field survey,
   wherein the field survey decreases a production rate of the production operation;
   modeling performance of one or more wells at the one or more field sites under each of the received scenarios, based on the real-time sensor data, to generate fluid flow results for each of the scenarios for the one or more field sites, including first fluid flow results corresponding to a scenario in which the field survey is performed and second fluid flow results corresponding to a scenario in which the field survey is not performed,
   wherein the modeling performance comprises utilizing a proxy model trained on historical production data from the one or more field sites, the proxy model configured to predict at least one of: oil production rate, oil production cumulative, water production rate, water production cumulative, gas production rate, gas production cumulative, reservoir pressure, or bottom hole pressure;

receiving probabilities for at least one technical field survey criterion;

generating values, based on the fluid flow results and the probabilities, that quantify:

a cost, a net present value, or a probability of success of the performance of the field survey at the one or more field sites; and a cost, a net present value, or a probability of success of the non-performance of the field survey at the one or more field sites;

controlling physical field equipment at the one or more field sites based on the generated values, the controlling comprising adjusting at least one of: a choke manifold setting, a heat exchanger parameter, a separator operating condition, or a fluid injection rate at the one or more field sites to optimize hydrocarbon production;

determining whether or not to perform the field survey at one of the one or more field sites based on a comparison of the generated values that quantify performance and non-performance of the field survey and the modeled performance that is based on the real-time sensor data;

in response to determining not to perform the field survey, not performing any field survey at the one or more field sites; and in response to determining to perform the field survey:

halting or interrupting the production operation;

performing the field survey; and monitoring that the production rate of the production operation is decreased by the physical sensors acquiring the sensor data in real-time, wherein the field survey comprises one or more of: a fluid sampling survey, bottom hole sample acquisition, geochemistry analysis, fluid analysis, water quality analysis, chemistry analysis, intra well tracer, inter well tracer, well testing, well logging, a bottom hole closed in pressure (BHCIP) survey, a BHCIP and gradient pressure (BHCIP+GRAD) survey, a bottom hole flowing pressure (BHFP) survey, a multi-rate test (MRT), a pressure build-up (PBU) survey, a pressure fall off (PFO) survey, a well head flowing pressure (WHFP) survey, a well head flowing temperature (WHFT) survey, a gas-oil ratio (GOR) survey, a water cut (WCT) survey, an interference test, a logging survey, a reservoir saturation tool (RST) survey, a production logging tool (PLT) survey, a distributed temperature sensing (DTS) survey, or a corrosion survey.

2. The method of claim 1, wherein:

the scenarios specify a start time and an end time;

the one or more field sites produce hydrocarbons at the start time and at the end time; and the fluid flow results comprise fluid flow results for at least the end time.

3. The method of claim 2, wherein the generated values are based on at least the fluid flow results at the end time.

4. The method of claim 1, further comprising, responsive to performance of the field survey, acquiring data and updating a model for at least one of the one or more field sites using at least a portion of the data.

5. The method of claim 1, wherein the modeling performance to generate fluid flow results comprises utilizing a model.

6. The method of claim 5, wherein the model comprises a trained machine learning model.

7. The method of claim 5, wherein the model comprises a proxy model.

8. The method of claim 1, further comprising accessing at least one of the probabilities from a database.

9. The method of claim 8, wherein the database comprises probabilities for historical success associated with one or more of the at least one technical field survey criterion for the field survey.

10. The method of claim 1, wherein the at least one technical field survey criterion comprises a technical feasibility criterion.

11. The method of claim 10, wherein the technical feasibility criterion depends on a number of sub-criteria that comprise at least one sub-criterion that accounts for a physical characteristic of each of the one or more field sites.

12. The method of claim 1, wherein the field survey comprises a downhole field survey.

13. The method of claim 1, wherein the field survey comprises a surface field survey.

14. The method of claim 1, wherein generating values comprises accounting for energy expended for performance of the field survey at each of the one or more field sites and energy generated by production of hydrocarbons at each of the one or more field sites.

15. The method of claim 14, wherein the determining whether or not to perform the field survey is further based at least in part on the energy expended and the energy generated.

16. The method of claim 1, further comprising:

generating a decision tree that comprises a decision point for the performance and the non-performance of the field survey that branches to a chance point associated with one of the at least one technical field survey criterion, wherein the chance point comprises chance point branches, and wherein each of the chance point branches comprises a respective one of the probabilities.

17. The method of claim 16, wherein:

the decision tree comprises multiple end points associated with performance of the field survey; and each of the multiple end points comprises at least one of the values.

18. A system, comprising:

one or more processors;

a memory accessible to at least one of the one or more processors; and processor-executable instructions stored in the memory and executable to instruct the system to:

receive sensor data from physical sensors deployed at one or more field sites, the sensor data comprising one or more of: choke manifold temperature, choke manifold pressure, heat exchanger temperature, heat exchanger pressure, separator temperature, separator pressure, oil flow rate from the separator, oil flow volume from the separator, water flow rate from the separator, water flow volume from the separator, or fluid levels in tanks of a system at the one or more field sites, the sensor data being acquired in real-time from the physical sensors during a production operation of the one or more field sites;

receive scenarios for the one or more field sites, each scenario including corresponding versions for performance of a field survey and non-performance of the field survey, wherein the field survey decreases a production rate of the production operation;

model performance of one or more wells at the one or more field sites under each of the received scenarios, based on the real-time sensor data, to generate fluid flow results for each of the scenarios for the one or more field sites, including first fluid flow results corresponding to a scenario in which the field survey is performed and second fluid flow results corresponding to a scenario in which the field survey is not performed, wherein the modeling performance comprises utilizing a proxy model trained on historical production data from the one or more field sites, the proxy model configured to predict at least one of: oil production rate, oil production cumulative, water production rate, water production cumulative, gas production rate, gas production cumulative, reservoir pressure, or bottom hole pressure;

receive probabilities for at least one technical field survey criterion;

generate values, based on the fluid flow results and the probabilities, that quantify:

a cost, a net present value, or a probability of success of the performance of the field survey at the one or more field sites; and a cost, a net present value, or a probability of success of the non-performance of the field survey at the one or more field sites;

control physical field equipment at the one or more field sites based on the generated values, the controlling comprising adjusting at least one of: a choke manifold setting, a heat exchanger parameter, a separator operating condition, or a fluid injection rate at the one or more field sites to optimize hydrocarbon production;

determine whether or not to perform the field survey at one of the one or more field sites based on a comparison of the generated values that quantify performance and non-performance of the field survey and the modeled performance that is based on the real-time sensor data;

in response to determining not to perform the field survey, not perform any field survey at the one or more field sites; and in response to determining to perform the field survey:

halting or interrupting the production operation;

performing the field survey; and monitoring that the production rate of the production operation is decreased by the physical sensors acquiring the sensor data in real-time, wherein the field survey comprises one or more of: a fluid sampling survey, bottom hole sample acquisition, geochemistry analysis, fluid analysis, water quality analysis, chemistry analysis, intra well tracer, inter well tracer, well testing, well logging, a bottom hole closed in pressure (BHCIP) survey, a BHCIP and gradient pressure (BHCIP+GRAD) survey, a bottom hole flowing pressure (BHFP) survey, a multi-rate test (MRT), a pressure build-up (PBU) survey, a pressure fall off (PFO) survey, a well head flowing pressure (WHFP) survey, a well head flowing temperature (WHFT) survey, a gas-oil ratio (GOR) survey, a water cut (WCT) survey, an interference test, a logging survey, a reservoir saturation tool (RST) survey, a production logging tool (PLT)

survey, a distributed temperature sensing (DTS) survey, or a corrosion survey.

19. One or more non-transitory computer-readable storage media comprising processor-executable instructions to instruct a computing system to:

receive sensor data from physical sensors deployed at one or more field sites, the sensor data comprising one or more of: choke manifold temperature, choke manifold pressure, heat exchanger temperature, heat exchanger pressure, separator temperature, separator pressure, oil flow rate from the separator, oil flow volume from the separator, water flow rate from the separator, water flow volume from the separator, or fluid levels in tanks of a system at the one or more field sites, the sensor data being acquired in real-time from the physical sensors during a production operation of the one or more field sites;

receive scenarios for the one or more field sites, each scenario including corresponding versions for performance of a field survey and non-performance of the field survey, wherein the field survey decreases a production rate of the production operation;

model performance of one or more wells at the one or more field sites under each of the received scenarios, based on the real-time sensor data, to generate fluid flow results for each of the scenarios for the one or more field sites, including first fluid flow results corresponding to a scenario in which the field survey is performed and second fluid flow results corresponding to a scenario in which the field survey is not performed, wherein the modeling performance comprises utilizing a proxy model trained on historical production data from the one or more field sites, the proxy model configured to predict at least one of: oil production rate, oil production cumulative, water production rate, water production cumulative, gas production rate, gas production cumulative, reservoir pressure, or bottom hole pressure;

receive probabilities for at least one technical field survey criterion;

generate values, based on the fluid flow results and the probabilities, that quantify:

a cost, a net present value, or a probability of success of the performance of the field survey at the one or more field sites; and a cost, a net present value, or a probability of success of the non-performance of the field survey at the one or more field sites;

control physical field equipment at the one or more field sites based on the generated values, the controlling comprising adjusting at least one of: a choke manifold setting, a heat exchanger parameter, a separator operating condition, or a fluid injection rate at the one or more field sites to optimize hydrocarbon production;

determine whether or not to perform the field survey at one of the one or more field sites based on a comparison of the generated values that quantify performance and non-performance of the field survey and the modeled performance that is based on the real-time sensor data;

in response to determining not to perform the field survey, not perform any field survey at the one or more field sites; and in response to determining to perform the field survey:

halting or interrupting the production operation;

performing the field survey; and monitoring that the production rate of the production operation is decreased by the physical sensors acquiring the sensor data in real-time, wherein the field survey comprises one or more of: a fluid sampling survey, bottom hole sample acquisition, geochemistry analysis, fluid analysis, water quality analysis, chemistry analysis, intra well tracer, inter well tracer, well testing, well logging, a bottom hole closed in pressure (BHCIP) survey, a BHCIP and gradient pressure (BHCIP+GRAD) survey, a bottom hole flowing pressure (BHFP) survey, a multi-rate test (MRT), a pressure build-up (PBU) survey, a pressure fall off (PFO) survey, a well head flowing pressure (WHFP) survey, a well head flowing temperature (WHFT) survey, a gas-oil ratio (GOR) survey, a water cut (WCT) survey, an interference test, a logging survey, a reservoir saturation tool (RST) survey, a production logging tool (PLT) survey, a distributed temperature sensing (DTS) survey, or a corrosion survey.

20. The method of claim 1, wherein:

the field survey comprises at least one of: a pressure build-up (PBU) survey, a pressure fall off (PFO) survey, a production logging tool (PLT) survey, or a reservoir saturation tool (RST) survey; and the method further comprises:

identifying, via the modeling performance, a specific physical condition at the one or more field sites comprising at least one of: fault transmissibility, water breakthrough location, or reservoir pressure distribution;

determining a voidage replacement ratio (VRR) for the one or more field sites based on the fluid flow results; and adjusting water injection operations at the one or more field sites based on the determined VRR and the generated values to maintain reservoir pressure within a specified range.

\* \* \* \* \*